United States Patent
Löhr et al.

(10) Patent No.: US 10,708,873 B2
(45) Date of Patent: *Jul. 7, 2020

(54) TRANSMISSION TIMING CONTROL FOR D2D COMMUNICATION

(71) Applicant: Sun Patent Trust, New York, NY (US)

(72) Inventors: Joachim Löhr, Wiesbaden (DE);
Prateek Basu Mallick, Langen (DE);
Michael Einhaus, Darmstadt (DE);
Sujuan Feng, Frankfurt am Main (DE);
Hidetoshi Suzuki, Kanagawa (JP);
Lilei Wang, Beijing (CN)

(73) Assignee: Sun Patent Trust, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/204,702

(22) Filed: Nov. 29, 2018

(65) Prior Publication Data
US 2019/0098592 A1 Mar. 28, 2019

Related U.S. Application Data

(63) Continuation of application No. 15/327,978, filed as application No. PCT/CN2014/083600 on Aug. 1, 2014, now Pat. No. 10,187,863.

(51) Int. Cl.
*H04L 7/00* (2006.01)
*H04W 56/00* (2009.01)
(Continued)

(52) U.S. Cl.
CPC ......... *H04W 56/002* (2013.01); *H04L 5/0053* (2013.01); *H04L 5/0094* (2013.01);
(Continued)

(58) Field of Classification Search
CPC ............ H04W 56/002; H04W 56/004; H04W 56/0045; H04W 56/005
(Continued)

(56) References Cited

U.S. PATENT DOCUMENTS 8,526,420 B2 * 9/2013 Weng ................. H04J 3/0682
370/350
9,461,899 B2 10/2016 Yoshizawa
(Continued)

FOREIGN PATENT DOCUMENTS

CN 13108405 A 5/2013
JP 2017-510151 A 4/2017
(Continued)

OTHER PUBLICATIONS

3GPP TR 25.912 V11.0.0, "3rd Generation Partnership Project; Technical Specification Group Radio Access Network; Feasibility study for evolved Universal Terrestrial Radio Access (UTRA) and Universal Terrestrial Radio Access Network (UTRAN) (Release 11)," Sep. 2012, 64 pages.

(Continued)

Primary Examiner — Dmitry Levitan
(74) Attorney, Agent, or Firm — Seed IP Law Group LLP

(57) ABSTRACT

The present invention relates to a transmitting terminal for transmitting data to a receiving terminal over a direct link connection. The transmitting terminal comprises a receiving unit that receives from the base station a timing command for adjusting an uplink transmission timing value for data transmissions to the base station. A generating unit generates direct link timing information, based on the uplink transmission timing value, the direct link timing information being usable for generating a direct link transmission timing value for determining the timing of the data transmission over the direct link. A transmitting unit transmits to the receiving terminal the generated direct link timing information, the direct link timing information being usable at the receiving terminal for generating a direct link reception timing value for determining the reception timing of data to be received on the direct link from the transmitting terminal.

20 Claims, 13 Drawing Sheets

(51) Int. Cl.

| | |
|---|---|
| *H04W 76/10* | (2018.01) |
| *H04W 76/14* | (2018.01) |
| *H04L 5/00* | (2006.01) |
| *H04W 8/00* | (2009.01) |
| *H04W 92/18* | (2009.01) |

(52) U.S. Cl.
CPC ........... *H04W 76/10* (2018.02); *H04W 76/14* (2018.02); *H04L 5/0037* (2013.01); *H04W 8/005* (2013.01); *H04W 92/18* (2013.01)

(58) Field of Classification Search
USPC .......................... 370/310, 328, 329, 341, 350
See application file for complete search history.

(56) References Cited

U.S. PATENT DOCUMENTS

| | | | |
|---|---|---|---|
| 9,578,666 | B2 | 2/2017 | Yamazaki |
| 9,832,800 | B2 | 11/2017 | Shin et al. |
| 10,225,815 | B2* | 3/2019 | Basu Mallick ... H04W 56/0015 |
| 2013/0322413 | A1 | 12/2013 | Pelletier et al. |
| 2014/0087744 | A1 | 3/2014 | Yang et al. |
| 2015/0036558 | A1* | 2/2015 | Ko .................. H04L 5/0032 370/280 |
| 2015/0245395 | A1 | 8/2015 | Yamazaki |
| 2015/0256429 | A1 | 9/2015 | Yoshizawa |
| 2015/0326373 | A1* | 11/2015 | Ryu ................ H04L 5/0053 370/330 |
| 2016/0338021 | A1 | 11/2016 | Chae et al. |
| 2016/0345348 | A1 | 11/2016 | Chae et al. |
| 2016/0366661 | A1 | 12/2016 | Yoshizawa |
| 2017/0026937 | A1 | 1/2017 | Jung et al. |
| 2017/0055264 | A1 | 2/2017 | Seo et al. |

FOREIGN PATENT DOCUMENTS

| | | |
|---|---|---|
| WO | 2013/002688 A1 | 1/2013 |
| WO | 2013/074462 A1 | 5/2013 |
| WO | 2013/104084 A1 | 7/2013 |
| WO | 2013/122432 A1 | 8/2013 |
| WO | 2014/031829 A2 | 2/2014 |
| WO | 2014/050887 A1 | 4/2014 |
| WO | 2014/087719 A1 | 6/2014 |
| WO | 2015/115794 A1 | 8/2015 |

OTHER PUBLICATIONS

3GPP TR 36.843 V12.0.0, "3$^{rd}$ Generation Partnership Project; Technical Specification Group Radio Access Network; Study on LTE device to device proximity services; Radio aspects (Release 12)," Mar. 2014, 49 pages.
3GPP TR 36.843 V12.0.1, "3$^{rd}$ Generation Partnership Project; Technical Specification Group Radio Access Network; Study on LTE Device to Device Proximity Services; Radio Aspects (Release 12)," Mar. 2014, 50 pages.
3GPP TS 23.303 V12.0.0, "3$^{rd}$ Generation Partnership Project; Technical Specification Group Services and System Aspects; Proximity-based services (ProSe); Stage 2 (Release 12)," Feb. 2014, 53 pages.
3GPP TS 36.133 V11.9.0, "3$^{rd}$ Generation Partnership Project; Technical Specification Group Radio Access Network; Evolved Universal Terrestrial Radio Access (E-UTRA); Requirements for support of radio resource management (Release 11)," Jul. 2014, 661 pages.
3GPP TS 36.211 V10.4.0, "3$^{rd}$ Generation Partnership Project; Technical Specification Group Radio Access Network; Evolved Universal Terrestrial Radio Access (E-UTRA); Physical Channels and Modulation (Release 10)," Dec. 2011, 101 pages.
3GPP TS 36.213 v12.2.0, "3$^{rd}$ Generation Partnership Project; Technical Specification Group Radio Access Network; Evolved Universal Terrestrial Radio Access (E-UTRA); Physical layer procedures (Release 12)," Jun. 2014, 207 pages.
3GPP TS 36.300 V12.2.0, "3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)," Jun. 2014, 215 pages.
3GPP TS 36.321 V8.0.0, "3$^{rd}$ Generation Partnership Project; Technical Specification Group Radio Access Network, Evolved Universal Terrestrial Radio Access (E-UTRA); Medium Access Control (MAC) protocol specification (Release 8)," Dec. 2007, 23 pages.
3GPP TS 36.321 V8.9.0, "3$^{rd}$ Generation Partnership Project; Technical Specification Group Radio Access Network, Evolved Universal Terrestrial Radio Access (E-UTRA); Medium Access Control (MAC) protocol specification (Release 8)," Jun. 2010, 47 pages.
3GPP TS 36.321 V10.5.0, "3$^{rd}$ Generation Partnership Project; Technical Specification Group Radio Access Network; Evolved Universal Terrestrial Radio Access (E-UTRA); Medium Access Control (MAC) protocol specification (Release 10)," Mar. 2012, 54 pages.
Alcatel-Lucent Shanghai Bell, Alcatel-Lucent, "D2D timing," R1-132994, 3GPP TSG RAN WG1 Meeting #74, Barcelona, Spain, Aug. 19-23, 2013, 6 pages.
"Applicable RRC states for Mode2," R2-141714, 3GPP TSG-RAN WG2 #85bis, Valencia, Spain, Mar. 31-Apr. 4, 2014, 3 pages.
Ericsson, "On Scheduling Assignments and Receiver Behaviour," R1-141391, 3GPP TSG-RAN WG1 Meeting #76bis, Shenzhen, China, Mar. 31-Apr. 4, 2014, 7 pages.
Ericsson, "On scheduling assignments," R1-142400, 3GPP TSG-RAN WG1 Meeting #77, Seoul, South Korea, May 19-23, 2014, 3 pages.
Extended European Search Report, dated Feb. 8, 2018, for the corresponding European Patent Application No. 14898361.2-1219 / 3175657, 11 pages.
HTC, "Considerations on D2D Transmission Timing," R1-140228, 3GPP TSG RAN WG1 Meeting #76, Prague, Czech Republic, Feb. 10-14, 2014, 4 pages.
International Search Report dated May 28, 2015, for corresponding International Application No. PCT/CN2014/083600, 2 pages.
Japanese Office Action, dated Jul. 31, 2018, for Japanese Application No. 2017-503595, 12 pages. (with English Translation).
Microsoft Corporation, "SA content for D2D broadcast communication," R1-142428, 3GPP TSG-RAN WG1 Meeting #77, Seoul, South Korea, May 19-23, 2014, 4 pages.
English Translation of Notice of Reasons for Rejections, dated Mar. 5, 2019, for corresponding Japanese Patent Application No. 2017-503595, 8 pages.
Panasonic, "Timing advance in D2D," R1-142997, 3GPP TSG RAN WG1 Meeting #78, Agenda Item: 7.2.3.1.1, Dresden, Germany, Aug. 18-22, 2014, 3 pages.
Extended European Search Report, dated Apr. 30, 2019, for European Application No. 19155092.0-1219, 10 pages.

* cited by examiner

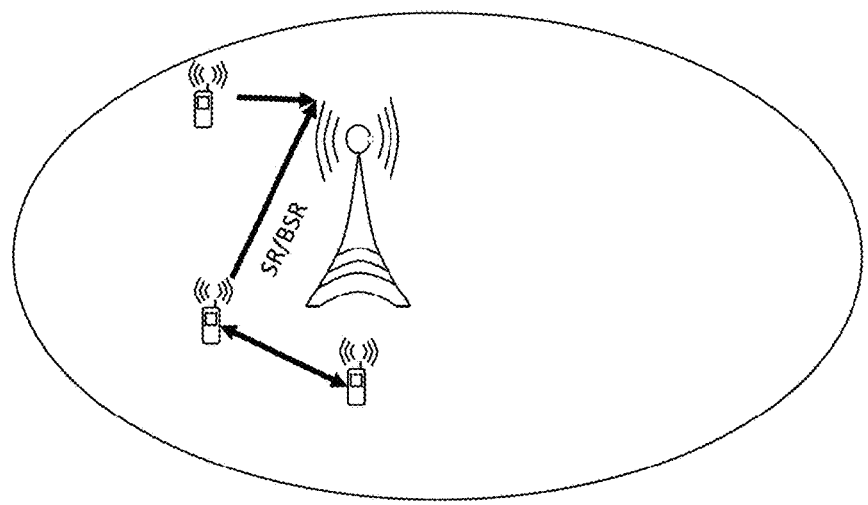
FIG. 7    (Prior Art)
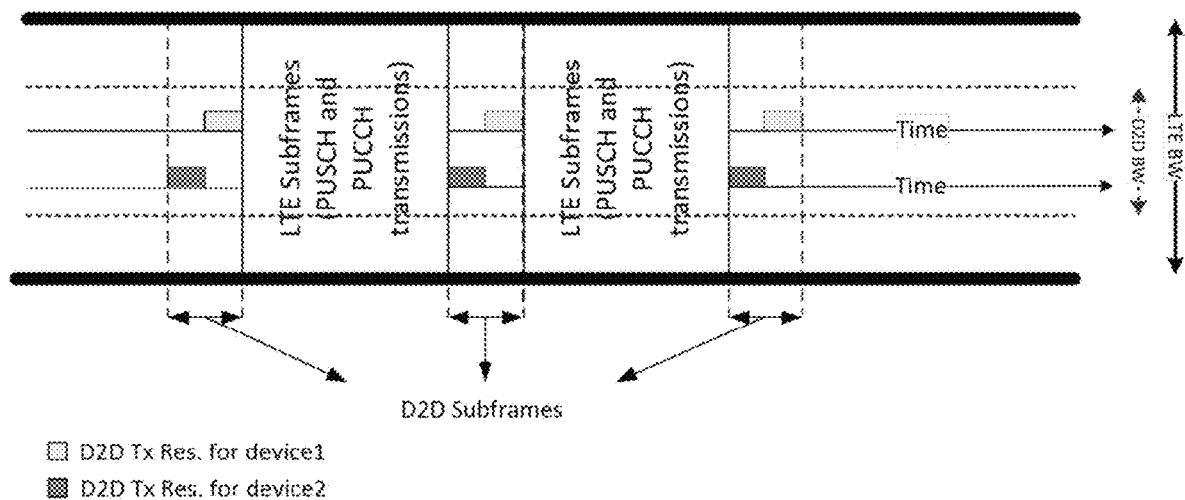
FIG. 8    (Prior Art)

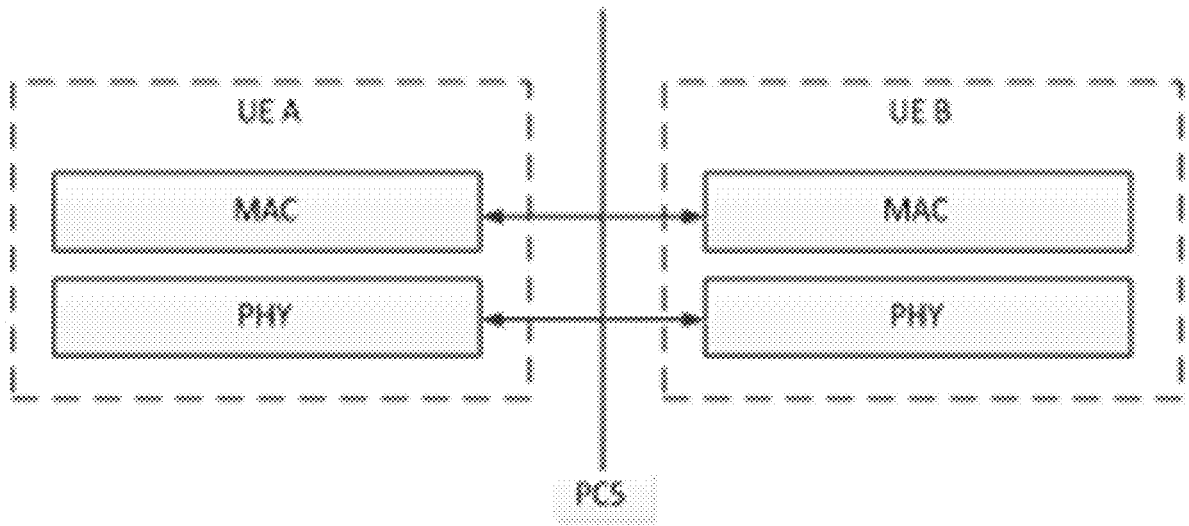
*FIG. 13* *(Prior Art)*
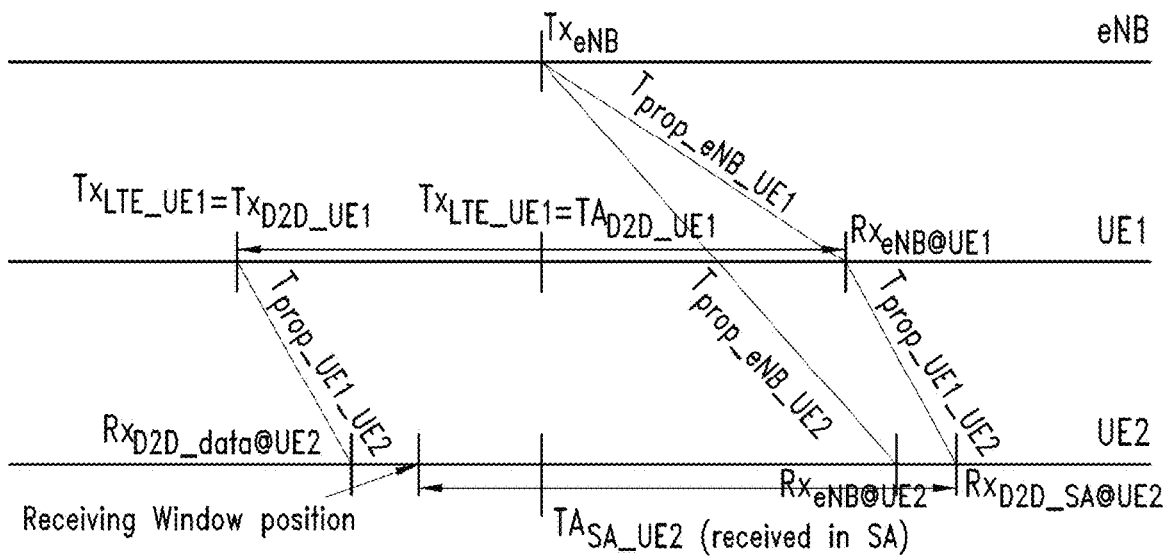
*FIG. 14*

TRANSMISSION TIMING CONTROL FOR D2D COMMUNICATION

FIELD OF THE INVENTION

The present invention relates to an apparatus and method for determining the transmission timing of a direct link data transmission in a D2D communication system. In particular, the present invention also relates to a user equipment capable of operating in a device to device communication system and capable performing the method of the invention.

TECHNICAL BACKGROUND

Long Term Evolution (LTE)

Third-generation mobile systems (3G) based on WCDMA radio-access technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio-access technology that is highly competitive.

In order to be prepared for further increasing user demands and to be competitive against new radio access technologies 3GPP introduced a new mobile communication system which is called Long Term Evolution (LTE). LTE is designed to meet the carrier needs for high speed data and media transport as well as high capacity voice support to the next decade. The ability to provide high bit rates is a key measure for LTE.

The work item (WI) specification on Long-Term Evolution (LTE) called Evolved UMTS Terrestrial Radio Access (UTRA) and UMTS Terrestrial Radio Access Network (UTRAN) is finalized as Release 8 (Rel. 8 LTE). The LTE system represents efficient packet-based radio access and radio access networks that provide full IP-based functionalities with low latency and low cost. In LTE, scalable multiple transmission bandwidths are specified such as 1.4, 3.0, 5.0, 10.0, 15.0, and 20.0 MHz, in order to achieve flexible system deployment using a given spectrum. In the downlink, Orthogonal Frequency Division Multiplexing (OFDM) based radio access was adopted because of its inherent immunity to multipath interference (MPI) due to a low symbol rate, the use of a cyclic prefix (CP), and its affinity to different transmission bandwidth arrangements. Single-carrier frequency division multiple access (SC-FDMA) based radio access was adopted in the uplink, since provisioning of wide area coverage was prioritized over improvement in the peak data rate considering the restricted transmission power of the user equipment (UE). Many key packet radio access techniques are employed including multiple-input multiple-output (MIMO) channel transmission techniques, and a highly efficient control signaling structure is achieved in Rel. 8 LTE.

LTE and E-UTRAN Architecture

The overall architecture is shown in FIG. 1 and a more detailed representation of the E-UTRAN architecture is given in FIG. 2.

As can be seen in FIG. 1, the LTE architecture supports interconnection of different radio access networks (RAN) such as UTRAN or GERAN (GSM EDGE Radio Access Network), which are connected to the EPC via the Serving GPRS Support Node (SGSN). In a 3GPP mobile network, the mobile terminal 110 (called User Equipment, UE, or device) is attached to the access network via the Node B (NB) in the UTRAN and via the evolved Node B (eNB) in the E-UTRAN access. The NB and eNB 120 entities are known as base station in other mobile networks. There are two data packet gateways located in the EPS for supporting the UE mobility—Serving Gateway (SGW) 130 and Packet Data Network Gateway 160 (PDN-GW or shortly PGW). Assuming the E-UTRAN access, the eNB entity 120 may be connected through wired lines to one or more SGWs via the S1-U interface ("U" stays for "user plane") and to the Mobility Management Entity 140 (MME) via the S1-MMME interface. The SGSN 150 and MME 140 are also referred to as serving core network (CN) nodes.

As depicted in FIG. 2, the E-UTRAN consists of evolved Node B (eNBs) 120, providing the E-UTRA user plane (PDCP/RLC/MAC/PHY) and control plane (RRC) protocol terminations towards the UE. The eNB 120 hosts the Physical (PHY), Medium Access Control (MAC), Radio Link Control (RLC), and Packet Data Control Protocol (PDCP) layers that include the functionality of user-plane header-compression and encryption. It also offers Radio Resource Control (RRC) functionality corresponding to the control plane. It performs many functions including radio resource management, admission control, scheduling, enforcement of negotiated UL QoS, cell information broadcast, ciphering/deciphering of user and control plane data, and compression/decompression of DL/UL user plane packet headers.

The eNBs are interconnected with each other by means of the X2 interface. The eNBs are also connected by means of the S1 interface to the EPC (Evolved Packet Core), more specifically to the MME (Mobility Management Entity) by means of the S1-MME and to the Serving Gateway (S-GW) by means of the S1-U. The S1 interface supports a many-to-many relation between MMEs/Serving Gateways and eNBs. The SGW routes and forwards user data packets, while also acting as the mobility anchor for the user plane during inter-eNB handovers and as the anchor for mobility between LTE and other 3GPP technologies (terminating S4 interface and relaying the traffic between 2G/3G systems and PDN GW). For idle state UEs, the SGW terminates the DL data path and triggers paging when DL data arrives for the UE. It manages and stores UE contexts, e.g. parameters of the IP bearer service, network internal routing information. It also performs replication of the user traffic in case of lawful interception.

The MME 140 is the key control-node for the LTE access-network. It is responsible for idle mode UE tracking and paging procedure including retransmissions. It is involved in the bearer activation/deactivation process and is also responsible for choosing the SGW for a UE at the initial attach and at time of intra-LTE handover involving Core Network (CN) node relocation. It is responsible for authenticating the user (by interacting with the HSS). The Non-Access Stratum (NAS) signaling terminates at the MME and it is also responsible for generation and allocation of temporary identities to UEs. It checks the authorization of the UE to camp on the service provider's Public Land Mobile Network (PLMN) and enforces UE roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming UEs.

Component Carrier Structure in LTE

FIGS. 3 and 4 illustrate the structure of a component carrier in LTE. The downlink component carrier of a 3GPP LTE system is subdivided in the time-frequency domain in so-called sub-frames. In 3GPP LTE each sub-frame is divided into two downlink slots as shown in FIG. 3, wherein the first downlink slot comprises the control channel region (PDCCH region) within the first OFDM symbols. Each sub-frame consists of a give number of OFDM symbols in the time domain (12 or 14 OFDM symbols in 3GPP LTE (Release 8)), wherein each of OFDM symbol spans over the entire bandwidth of the component carrier. The OFDM symbols thus each consist of a number of modulation symbols transmitted on respective $N_{RB}^{DL} \times N_{sc}^{RB}$ subcarriers as also shown in FIG. 4.

Assuming a multi-carrier communication system, e.g. employing OFDM, as for example used in 3GPP Long Term Evolution (LTE), the smallest unit of resources that can be assigned by the scheduler is one "resource block". A physical resource block is defined as $N_{symb}^{DL}$ consecutive OFDM symbols in the time domain and $N_{sc}^{RB}$ consecutive subcarriers in the frequency domain as exemplified in FIG. 4. In 3GPP LTE (Release 8), a physical resource block thus consists of $N_{symb}^{DL} \times N_{sc}^{RB}$ resource elements, corresponding to one slot in the time domain and 180 kHz in the frequency domain (further details on the downlink resource grid can be found, for example, in 3GPP TS 36.211, "Evolved universal terrestrial radio access (E-UTRA); physical channels and modulations (Release 10)", version 10.4.0, 2011, Section 6.2, freely available at www.3gpp.org, which is incorporated herein by reference).

While it can happen that some resource elements within a resource block or resource block pair are not used even though it has been scheduled, for simplicity of the used terminology still the whole resource block or resource block pair is assigned. Examples for resource elements that are actually not assigned by a scheduler include reference signals, broadcast signals, synchronization signals, and resource elements used for various control signal or channel transmissions.

The number of physical resource blocks in downlink depends on the downlink transmission bandwidth configured in the cell and is at present defined in LTE as being from the interval of 6 to 110 (P)RBs. It is common practice in LTE to denote the bandwidth either in units of Hz (e.g. 10 MHz) or in units of resource blocks, e.g. for the downlink case the cell bandwidth can equivalently expressed as e.g. 10 MHz or.

A channel resource may be defined as a "resource block" as exemplary illustrated in FIG. 3 where a multi-carrier communication system, e.g. employing OFDM as for example discussed in the LTE work item of 3GPP, is assumed. More generally, it may be assumed that a resource block designates the smallest resource unit on an air interface of a mobile communication that can be assigned by a scheduler. The dimensions of a resource block may be any combination of time (e.g. time slot, subframe, frame, etc. for time division multiplex (TDM)), frequency (e.g. subband, carrier frequency, etc. for frequency division multiplex (FDM)), code (e.g. spreading code for code division multiplex (CDM)), antenna (e.g. Multiple Input Multiple Output (MIMO)), etc. depending on the access scheme used in the mobile communication system.

The data are mapped onto physical resource blocks by means of pairs of virtual resource blocks. A pair of virtual resource blocks is mapped onto a pair of physical resource blocks. The following two types of virtual resource blocks are defined according to their mapping on the physical resource blocks in LTE downlink: Localized Virtual Resource Block (LVRB) and Distributed Virtual Resource Block (DVRB). In the localized transmission mode using the localized VRBs, the eNB has full control which and how many resource blocks are used, and should use this control usually to pick resource blocks that result in a large spectral efficiency. In most mobile communication systems, this results in adjacent physical resource blocks or multiple clusters of adjacent physical resource blocks for the transmission to a single user equipment, because the radio channel is coherent in the frequency domain, implying that if one physical resource block offers a large spectral efficiency, then it is very likely that an adjacent physical resource block offers a similarly large spectral efficiency. In the distributed transmission mode using the distributed VRBs, the physical resource blocks carrying data for the same UE are distributed across the frequency band in order to hit at least some physical resource blocks that offer a sufficiently large spectral efficiency, thereby obtaining frequency diversity.

In 3GPP LTE Release 8 the downlink control signaling is basically carried by the following three physical channels:

Physical control format indicator channel (PCFICH) for indicating the number of OFDM symbols used for control signaling in a subframe (i.e. the size of the control channel region);

Physical hybrid ARQ indicator channel (PHICH) for carrying the downlink ACK/NACK associated with uplink data transmission; and Physical downlink control channel (PDCCH) for carrying downlink scheduling assignments and uplink scheduling assignments.

The PCFICH is sent from a known position within the control signaling region of a downlink subframe using a known pre-defined modulation and coding scheme. The user equipment decodes the PCFICH in order to obtain information about a size of the control signaling region in a subframe, for instance, the number of OFDM symbols. If the user equipment (UE) is unable to decode the PCFICH or if it obtains an erroneous PCFICH value, it will not be able to correctly decode the L1/L2 control signaling (PDCCH) comprised in the control signaling region, which may result in losing all resource assignments contained therein.

The PDCCH carries control information, such as, for instance, scheduling grants for allocating resources for downlink or uplink data transmission. The PDCCH for the user equipment is transmitted on the first of either one, two or three OFDM symbols according to PCFICH within a subframe.

Physical downlink shared channel (PDSCH) is used to transport user data. PDSCH is mapped to the remaining OFDM symbols within one subframe after PDCCH. The PDSCH resources allocated for one UE are in the units of resource block for each subframe.

Physical uplink shared channel (PUSCH) carries user data. Physical Uplink Control Channel (PUCCH) carries signaling in the uplink direction such as scheduling requests, HARQ positive and negative acknowledgements in response to data packets on PDSCH, and channel state information (CSI).

The term "component carrier" refers to a combination of several resource blocks. In future releases of LTE, the term "component carrier" is no longer used; instead, the terminology is changed to "cell", which refers to a combination of downlink and optionally uplink resources. The linking between the carrier frequency of the downlink resources and the carrier frequency of the uplink resources is indicated in the system information transmitted on the downlink resources.

Further Advancements for LTE (LTE-A)

The frequency spectrum for International Mobile Telecommunications-Advanced (IMT-Advanced) was decided at the World Radio communication Conference 2007 (WRC-07). Although the overall frequency spectrum for IMT-Advanced was decided, the actual available frequency bandwidth is different according to each region or country. Following the decision on the available frequency spectrum outline, however, standardization of a radio interface started in the 3rd Generation Partnership Project (3GPP). At the 3GPP TSG RAN #39 meeting, the Study Item description on "Further Advancements for E-UTRA (LTE-Advanced)" was approved in the 3GPP. The study item covers technology components to be considered for the evolution of E-UTRA, e.g. to fulfill the requirements on IMT-Advanced. Two major technology components which are currently under consideration for LTE-A are described in the following.

Carrier Aggregation in LTE-A for Support of Wider Bandwidth

The bandwidth that the LTE-Advanced system is able to support is 100 MHz, while an LTE system can only support 20 MHz. Nowadays, the lack of radio spectrum has become a bottleneck of the development of wireless networks, and as a result it is difficult to find a spectrum band which is wide enough for the LTE-Advanced system. Consequently, it is urgent to find a way to gain a wider radio spectrum band, wherein a possible answer is the carrier aggregation functionality.

In carrier aggregation, two or more component carriers (CCs) are aggregated in order to support wider transmission bandwidths up to 100 MHz. Several cells in the LTE system are aggregated into one wider channel in the LTE-Advanced system which is wide enough for 100 MHz, even though these cells in LTE are in different frequency bands. A UE may simultaneously receive or transmit on one or multiple CCs depending on its capabilities:

A Rel-10 UE with reception and/or transmission capabilities for CA can simultaneously receive and/or transmit on multiple CCs corresponding to multiple serving cells;

A Rel-8/9 UE can receive on a single CC and transmit on a single CC corresponding to one serving cell only.

Carrier aggregation (CA) is supported for both contiguous and non-contiguous CCs with each CC limited to a maximum of 110 Resource Blocks in the frequency domain using the Rel-8/9 numerology.

It is possible to configure a user equipment to aggregate a different number of component carriers originating from the same eNodeB (base station) and of possibly different bandwidths in the uplink and the downlink. The number of downlink component carriers that can be configured depends on the downlink aggregation capability of the UE. Conversely, the number of uplink component carriers that can be configured depends on the uplink aggregation capability of the UE. It may not be possible to configure a mobile terminal with more uplink component carriers than downlink component carriers.

In a typical TDD deployment, the number of component carriers and the bandwidth of each component carrier in uplink and downlink is the same. Component carriers originating from the same eNodeB need not to provide the same coverage.

Component carriers shall be LTE Rel-8/9 compatible. Nevertheless, existing mechanisms (e.g. barring) may be used to avoid Rel-8/9 UEs to camp on a component carrier.

The spacing between center frequencies of contiguously aggregated component carriers shall be a multiple of 300 kHz. This is in order to be compatible with the 100 kHz frequency raster of 3GPP LTE (Release 8/9) and at the same time preserve orthogonally of the subcarriers with 15 kHz spacing. Depending on the aggregation scenario, the n×300 kHz spacing can be facilitated by insertion of a low number of unused subcarriers between contiguous component carriers.

The nature of the aggregation of multiple carriers is only exposed up to the MAC layer. For both uplink and downlink there is one HARQ entity required in MAC for each aggregated component carrier. There is (in the absence of SU-MIMO for uplink) at most one transport block per component carrier. A transport block and its potential HARQ retransmissions need to be mapped on the same component carrier.

The Layer 2 structure with activated carrier aggregation is shown in FIG. 5 and FIG. 6 for the downlink and uplink respectively. The transport channels are described between MAC and Layer 1, the logical channels are described between MAC and RLC.

When carrier aggregation (CA) is configured, the UE only has one RRC connection with the network. At RRC connection establishment/re-establishment/handover, one serving cell provides the NAS mobility information (e.g. TAI), and at RRC connection re-establishment/handover, one serving cell provides the security input. This cell is referred to as the Primary Cell (PCell). In the downlink, the carrier corresponding to the PCell is the Downlink Primary Component Carrier (DL PCC) while in the uplink it is the Uplink Primary Component Carrier (UL PCC).

Depending on UE capabilities, Secondary Cells (SCells) can be configured to form together with the PCell a set of serving cells. In the downlink, the carrier corresponding to an SCell is a Downlink Secondary Component Carrier (DL SCC), while in the uplink it is an Uplink Secondary Component Carrier (UL SCC).

The configured set of serving cells for a UE therefore always consists of one PCell and one or more SCells:

For each SCell the usage of uplink resources by the UE in addition to the downlink ones is configurable (the number of DL SCCs configured is therefore always larger or equal to the number of UL SCCs and no SCell can be configured for usage of uplink resources only);

From a UE viewpoint, each uplink resource only belongs to one serving cell;

The number of serving cells that can be configured depends on the aggregation capability of the UE;

PCell can only be changed with handover procedure (i.e. with security key change and RACH procedure);

PCell is used for transmission of PUCCH;

Unlike SCells, PCell cannot be de-activated;

Re-establishment is triggered when the PCell experiences Rayleigh fading (RLF), not when SCells experience RLF;

Non-access stratum (NAS) information is taken from the downlink PCell; The configuration and reconfiguration of component carriers can be performed by RRC.

Activation and deactivation is done via MAC control elements. At intra-LTE handover, RRC can also add, remove, or reconfigure SCells for usage in the target cell. The reconfiguration, addition and removal of SCells can be performed by RRC. At intra-LTE handover, RRC can also add, remove, or reconfigure SCells for usage with the target PCell. When adding a new SCell, dedicated RRC signaling is used for sending all required system information of the SCell i.e. while in connected mode, UEs need not acquire broadcasted system information directly from the SCells.

When a user equipment is configured with carrier aggregation there is one pair of uplink and downlink component carriers that is always active. The downlink component carrier of that pair might be also referred to as 'DL anchor carrier'. Same applies also for the uplink.

When carrier aggregation is configured, a user equipment may be scheduled over multiple component carriers simultaneously but at most one random access procedure shall be ongoing at any time. Cross-carrier scheduling allows the PDCCH of a component carrier to schedule resources on another component carrier. For this purpose a component carrier identification field is introduced in the respective DCI formats, called CIF.

A linking between uplink and downlink component carriers allows identifying the uplink component carrier for which the grant applies when there is no-cross-carrier scheduling. The linkage of downlink component carriers to uplink component carrier does not necessarily need to be one to one. In other words, more than one downlink component carrier can link to the same uplink component carrier. At the same time, a downlink component carrier can only link to one uplink component carrier.

LTE RRC States

The following is mainly describing the two main states in LTE: "RRC_IDLE" and "RRC_CONNECTED".

In RRC_IDLE the radio is not active, but an ID is assigned and tracked by the network. More specifically, a mobile terminal in RRC_IDLE performs cell selection and reselection—in other words, it decides on which cell to camp. The cell (re)selection process takes into account the priority of each applicable frequency of each applicable Radio Access Technology (RAT), the radio link quality and the cell status (i.e. whether a cell is barred or reserved). An RRC_IDLE mobile terminal monitors a paging channel to detect incoming calls, and also acquires system information. The system information mainly consists of parameters by which the network (E-UTRAN) can control the cell (re) selection process. RRC specifies the control signalling applicable for a mobile terminal in RRC_IDLE, namely paging and system information. The mobile terminal behaviour in RRC_IDLE is specified in TR 25.912, e.g. Chapter 8.4.2 incorporate herein by reference.

In RRC_CONNECTED the mobile terminal has an active radio operation with contexts in the eNodeB. The E-UTRAN allocates radio resources to the mobile terminal to facilitate the transfer of (unicast) data via shared data channels. To support this operation, the mobile terminal monitors an associated control channel which is used to indicate the dynamic allocation of the shared transmission resources in time and frequency. The mobile terminal provides the network with reports of its buffer status and of the downlink channel quality, as well as neighbouring cell measurement information to enable E-UTRAN to select the most appropriate cell for the mobile terminal. These measurement reports include cells using other frequencies or RATs. The UE also receives system information, consisting mainly of information required to use the transmission channels. To extend its battery lifetime, a UE in RRC_CONNECTED may be configured with a Discontinuous Reception (DRX) cycle. RRC is the protocol by which the E-UTRAN controls the UE behaviour in RRC_CONNECTED.

Uplink Access Scheme for LTE

For Uplink transmission, power-efficient user-terminal transmission is necessary to maximize coverage. Single-carrier transmission combined with FDMA with dynamic bandwidth allocation has been chosen as the evolved UTRA uplink transmission scheme. The main reason for the preference for single-carrier transmission is the lower peak-to-average power ratio (PAPR), compared to multi-carrier signals (OFDMA), and the corresponding improved power-amplifier efficiency and assumed improved coverage (higher data rates for a given terminal peak power). During each time interval, Node B assigns users a unique time/frequency resource for transmitting user data thereby ensuring intra-cell orthogonality. An orthogonal access in the uplink promises increased spectral efficiency by eliminating intra-cell interference. Interference due to multipath propagation is handled at the base station (Node B), aided by insertion of a cyclic prefix in the transmitted signal.

The basic physical resource used for data transmission consists of a frequency resource of size BWgrant during one time interval, e.g. a sub-frame of 0.5 ms, onto which coded information bits are mapped. It should be noted that a sub-frame, also referred to as transmission time interval (TTI), is the smallest time interval for user data transmission. It is however possible to assign a frequency resource BWgrant over a longer time period than one TTI to a user by concatenation of sub-frames.

Uplink Scheduling Scheme for LTE

The uplink scheme allows for both scheduled access, i.e. controlled by eNB, and contention-based access.

In case of scheduled access the UE is allocated a certain frequency resource for a certain time (i.e. a time/frequency resource) for uplink data transmission. However, some time/frequency resources can be allocated for contention-based access. Within these time/frequency resources, UEs can transmit without first being scheduled. One scenario where UE is making a contention-based access is for example the random access, i.e. when UE is performing initial access to a cell or for requesting uplink resources.

For the scheduled access the Node B scheduler assigns a user a unique frequency/time resource for uplink data transmission. More specifically the scheduler determines
 which UE(s) that is (are) allowed to transmit,
 which physical channel resources (frequency),
 Transport format (Modulation Coding Scheme (MCS)) to be used by the mobile terminal for transmission The allocation information is signaled to the UE via a scheduling grant, sent on the L1/L2 control channel. For simplicity reasons this channel is called uplink grant channel in the following. A scheduling grant message contains at least information which part of the frequency band the UE is allowed to use, the validity period of the grant, and the transport format the UE has to use for the upcoming uplink transmission. The shortest validity period is one sub-frame. Additional information may also be included in the grant message, depending on the selected scheme. Only "per UE" grants are used to grant the right to transmit on the UL-SCH (i.e. there are no "per UE per RB" grants). Therefore the UE needs to distribute the allocated resources among the radio bearers according to some rules, which will be explained in detail in one of the next sections. Unlike in HSUPA there is no UE based transport format selection. The eNB decides the transport format based on some information, e.g. reported scheduling information and QoS info, and UE has to follow the selected transport format.

Buffer Status Reporting/Scheduling Request Procedure for Uplink Scheduling

The usual mode of scheduling is dynamic scheduling, by means of downlink assignment messages for the allocation of downlink transmission resources and uplink grant messages for the allocation of uplink transmission resources; these are usually valid for specific single subframes. They are transmitted on the PDCCH using C-RNTI of the UE as already mentioned before. Dynamic scheduling is efficient for services types, in which the traffic is bursty and dynamic in rate, such as TCP.

In addition to the dynamic scheduling, a persistent scheduling is defined, which enables radio resources to be semi-statically configured and allocated to a UE for a longer time period than one subframe, thus avoiding the need for specific downlink assignment messages or uplink grant messages over the PDCCH for each subframe. Persistent scheduling is useful for services such as VoIP for which the data packets are small, periodic and semi-static in size. Thus, the overhead of the PDCCH is significantly reduced compared to the case of dynamic scheduling.

Buffer status reports (BSR) from the UE to the eNB are used to assist the eNodeB in allocating uplink resources, i.e. uplink scheduling as explained in more in detail in [2]. For the downlink case the eNB scheduler is obviously aware of the amount of data to be delivered to each UE, however for the uplink direction since scheduling decisions are done at the eNB and the buffer for the data is in the UE, BSRs have to be sent from UE to the eNB in order to indicate the amount of data that needs to be transmitted over UL-SCH.

There are basically two types of BSR defined for LTE: a long BSR and a short BSR. Which one is transmitted by the UE depends on the available transmission resources in a transport block, on how many groups of logical channels have non-empty buffer, and on whether a specific event is triggered at the UE. The long BSR reports the amount of data for four logical channel groups, whereas the short BSR indicates only the amount of data buffered for the highest logical channel group. The reason for introducing the logical channel group concept is that even though the UE may have more than four logical channels configured reporting the buffer status for each individual logical channel would cause too much signalling overhead. Therefore eNB assigns each logical channel to a logical channel group; preferably logical channels with the same/similar QoS requirements should be allocated within the same logical channel group.

Which one of either the short or the long BSR is transmitted by the UE depends on the available transmission resources in a transport block, on how many groups of logical channels have non-empty buffers and on whether a specific event is triggered at the UE. The long BSR reports the amount of data for four logical channel groups, whereas the short BSR indicates the amount of data buffered for only the highest logical channel group.

The reason for introducing the logical channel group concept is that even though the UE may have more than four logical channels configured, reporting the buffer status for each individual logical channel would cause too much signaling overhead. Therefore, the eNB assigns each logical channel to a logical channel group; preferably, logical channels with same/similar QoS requirements should be allocated within the same logical channel group.

A BSR may be triggered, as an example, for the following events:

Whenever data arrives for a logical channel, which has a higher priority than the logical channels whose buffer are non-empty;

Whenever data becomes available for any logical channel, when there was previously no data available for transmission;

Whenever the retransmission BSR time expires;

Whenever periodic BSR reporting is due, i.e. periodic BSR timer expires;

Whenever there is a spare space in a transport block which can accommodate a BSR.

In order to be robust against transmission failures there is a BSR retransmission mechanism defined for LTE; the retransmission BSR timer is started or restarted whenever an uplink grant is received. If no uplink grant is received before the timer expires another BSR is triggered by the UE.

If the UE has no uplink resources allocated for including a BSR in the TB when a BSR is triggered the UE sends a scheduling request (SR) on the Physical Uplink Control Channel (PUCCH) if configured. For the case that there are no D-SR (dedicated Scheduling request) resources on PUCCH configured UE will start the Random Access Procedure (RACH procedure) in order to request UL-SCH resources for transmission the BSR info to eNB. However it should be noted that the UE will not trigger SR transmission for the case that a periodic BSR is to be transmitted.

Furthermore an enhancement to the SR transmission has been introduced for a specific scheduling mode where resources are persistently allocated with a defined periodicity in order to save L1/2 control signalling overhead for transmission grants, which is referred to as semi-persistent scheduling (SPS). One example for a service, which has been mainly considered for semi-persistent scheduling is VoIP. Every 20 ms a VoIP packets is generated at the Codec during a talk-spurt. Therefore eNB can allocate uplink or respectively downlink resource persistently every 20 ms, which could be then used for the transmission of VoIP packets. In General SPS is beneficial for services with predictable traffic behaviour, i.e. constant bit rate, packet arrival time is periodic. For the case that SPS is configured for the uplink direction, the eNB can turn off SR triggering/transmission for certain configured logical channels, i.e. BSR triggering due to data arrival on those specific configured logical channels will not trigger an SR. The motivation for such kind of enhancements is reporting an SR for those logical channels which will use the semi-persistently allocated resources (logical channels which carry VoIP packets) is of no value for eNB scheduling and hence should be avoided.

More detailed information with regard to BSR procedures and in particular the triggering of same is explained in 3GPP TS 36.321 V10.5 in Chapter 5.4.5 incorporated herewith by reference.

Logical Channel Prioritization

The UE has an uplink rate control function which manages the sharing of uplink resources between radio bearers. This uplink rate control function is also referred to as logical channel prioritization procedure in the following. The Logical Channel Prioritization (LCP) procedure is applied when a new transmission is performed, i.e. a Transport block needs to be generated. One proposal for assigning capacity has been to assign resources to each bearer, in priority order, until each has received an allocation equivalent to the minimum data rate for that bearer, after which any additional capacity is assigned to bearers in, for example, priority order.

As will become evident from the description of the LCP procedure given below, the implementation of the LCP procedure residing in the UE is based on the token bucket model, which is well known in the IP world. The basic functionality of this model is as follows. Periodically at a given rate a token, which represents the right to transmit a quantity of data, is added to the bucket. When the UE is granted resources, it is allowed to transmit data up to the amount represented by the number of tokens in the bucket. When transmitting data the UE removes the number of tokens equivalent to the quantity of transmitted data. In case the bucket is full, any further tokens are discarded. For the addition of tokens it could be assumed that the period of the repetition of this process would be every TTI, but it could be easily lengthened such that a token is only added every second. Basically instead of every 1 ms a token is added to the bucket, 1000 tokens could be added every second. In the following the logical channel prioritization procedure which is used in Rel-8 is described [TS 36.321]. More detailed information with regard to the LCP procedure is explained in 3GPP TS 36.321 V8 in Chapter 5.4.3.1, incorporated herewith by reference.

RRC controls the scheduling of uplink data by signalling for each logical channel: priority where an increasing priority value indicates a lower priority level, prioritised BitRate which sets the Prioritized Bit Rate (PBR), bucketSizeDuration which sets the Bucket Size Duration (BSD). The idea behind prioritized bit rate is to support for each bearer, including low priority non-GBR bearers, a minimum bit rate in order to avoid a potential starvation. Each bearer should at least get enough resources in order to achieve the prioritized bit rate (PRB).

The UE shall maintain a variable Bj for each logical channel j. Bj shall be initialized to zero when the related logical channel is established, and incremented by the product PBR×TTI duration for each TTI, where PBR is Prioritized Bit Rate of logical channel j. However, the value of Bj can never exceed the bucket size and if the value of Bj is larger than the bucket size of logical channel j, it shall be set to the bucket size. The bucket size of a logical channel is equal to PBR×BSD, where PBR and BSD are configured by upper layers.

The UE shall perform the following Logical Channel Prioritization procedure when a new transmission is performed:

The UE shall allocate resources to the logical channels in the following steps:

Step 1: All the logical channels with Bj>0 are allocated resources in a decreasing priority order. If the PBR of a radio bearer is set to "infinity", the UE shall allocate resources for all the data that is available for transmission on the radio bearer before meeting the PBR of the lower priority radio bearer(s);

Step 2: the UE shall decrement Bj by the total size of MAC SDUs served to logical channel j in Step 1.

It has to be noted at this point that the value of Bj can be negative.

Step 3: if any resources remain, all the logical channels are served in a strict decreasing priority order (regardless of the value of Bj) until either the data for that logical channel or the UL grant is exhausted, whichever comes first. Logical channels configured with equal priority should be served equally.

The UE shall also follow the rules below during the scheduling procedures above:

the UE should not segment an RLC SDU (or partially transmitted SDU or retransmitted RLC PDU) if the whole SDU (or partially transmitted SDU or retransmitted RLC PDU) fits into the remaining resources;

if the UE segments an RLC SDU from the logical channel, it shall maximize the size of the segment to fill the grant as much as possible;

UE should maximise the transmission of data.

For the Logical Channel Prioritization procedure, the UE shall take into account the following relative priority in decreasing order:

MAC control element for C-RNTI or data from UL-CCCH;

MAC control element for BSR, with exception of BSR included for padding;

MAC control element for PHR;

data from any Logical Channel, except data from UL-CCCH;

MAC control element for BSR included for padding.

For the case of carrier aggregation, which is described in a later section, when the UE is requested to transmit multiple MAC PDUs in one TTI, steps 1 to 3 and the associated rules may be applied either to each grant independently or to the sum of the capacities of the grants. Also the order in which the grants are processed is left up to UE implementation. It is up to the UE implementation to decide in which MAC PDU a MAC control element is included when UE is requested to transmit multiple MAC PDUs in one TTI.

Uplink Power Control

Uplink transmission power control in a mobile communication system serves an important purpose: it balances the need for sufficient transmitted energy per bit to achieve the required Quality-of-Service (QoS), against the needs to minimize interference to other users of the system and to maximize the battery life of the mobile terminal. In achieving this purpose, the role of the Power Control (PC) becomes decisive to provide the required SINR while controlling at the same time the interference caused to neighbouring cells. The idea of classic PC schemes in uplink is that all users are received with the same SINR, which is known as full compensation. As an alternative, 3GPP has adopted for LTE the use of Fractional Power Control (FPC). This new functionality makes users with a higher path-loss operate at a lower SINR requirement so that they will more likely generate less interference to neighbouring cells.

Detailed power control formulae are specified in LTE for the Physical Uplink Shared Channel (PUSCH), Physical Uplink Control Channel (PUCCH) and the Sounding Reference Signals (SRSs) (section 5.1 in TS 36.213). The formula for each of these uplink signals follows the same basic principles; in all cases they can be considered as a summation of two main terms: a basic open-loop operating point derived from static or semi-static parameters signalled by the eNodeB, and a dynamic offset updated from subframe to subframe.

The basic open-loop operating point for the transmit power per resource block depends on a number of factors including the inter-cell interference and cell load. It can be further broken down into two components, a semi-static base level P0, further comprised of a common power level for all UEs in the cell (measured in dBm) and a UE-specific offset, and an open-loop path-loss compensation component. The dynamic offset part of the power per resource block can also be further broken down into two components, a component dependent on the used MCS and explicit Transmitter Power Control (TPC) commands.

The MCS-dependent component (referred to in the LTE specifications as, where TF stands for 'Transport Format') allows the transmitted power per RB to be adapted according to the transmitted information data rate.

The other component of the dynamic offset is the UE-specific TPC commands. These can operate in two different modes: accumulative TPC commands (available for PUSCH, PUCCH and SRS) and absolute TPC commands (available for PUSCH only). For the PUSCH, the switch between these two modes is configured semi-statically for each UE by RRC signalling—i.e. the mode cannot be changed dynamically. With the accumulative TPC commands, each TPC command signals a power step relative to the previous level.

Timing Advance

For the uplink transmission scheme of LTE single-carrier frequency division multiple access (SC-FDMA) was chosen to achieve an orthogonal multiple-access in time and frequency between the different UEs transmitting in the uplink.

Uplink orthogonality is maintained by ensuring that the transmissions from different UEs in a cell are time-aligned at the receiver of the eNB. This avoids intracell interference occurring, both between UEs assigned to transmit in consecutive subframes and between UEs transmitting on adjacent subcarriers. Time alignment of the uplink transmissions is achieved by applying a timing advance at the UE transmitter, relative to the received downlink timing. This is illustrated in FIG. 5. The main role of this is to counteract differing propagation delays between different UEs.

Timing Advance Procedure

When UE is synchronized to the downlink transmissions received from eNB, the initial timing advance is set by means of the random access procedure. This involves the UE transmitting a random access preamble from which the eNodeB can estimate the uplink timing and respond with an 11-bit initial timing advance command contained within the Random Access Response (RAR) message. This allows the timing advance to be configured by the eNodeB with a granularity of 0.52 μs from 0 up to a maximum of 0.67 ms.

Once the timing advance has been first set for each user equipment, the timing advance is updated from time to time to counteract changes in the arrival time of the uplink signals at the eNodeB. In deriving the timing advance update commands, the eNodeB may measure any uplink signal which is useful. The details of the uplink timing measurements at the eNodeB are not specified, but left to the implementation of the eNodeB.

The timing advance update commands are generated at the Medium Access Control (MAC) layer in the eNodeB and transmitted to the user equipment as MAC control elements which may be multiplexed together with data on the Physical Downlink Shared Channel (PDSCH). Like the initial timing advance command in the response to the Random Access Channel (RACH) preamble, the update commands have a granularity of 0.52 μs. The range of the update commands is ±16 μs, allowing a step change in uplink timing equivalent to the length of the extended cyclic prefix. They would typically not be sent more frequently than about every 2 seconds. In practice, fast updates are unlikely to be necessary, as even for a user equipment moving at 500 km/h the change in round-trip path length is not more than 278 m/s, corresponding to a change in round-trip time of 0.93 μs/s.

Upon reception of a timing advance command, the UE shall adjust its uplink transmission timing for PUCCH/PUSCH/SRS of the primary cell. The timing advance command indicates the change of the uplink timing relative to the current uplink timing as multiples of $16T_s$. The UL transmission timing for PUSCH/SRS of a secondary cell is the same as the primary cell.

In case of random access response, 11-bit timing advance command, $T_A$, indicates $N_{TA}$ values by index values of $T_A=0, 1, 2, \ldots, 1282$, where an amount of the time alignment is given by $N_{TA}=T_A \times 16$. $N_{TA}$ is defined in [3].

In other cases, 6-bit timing advance command, $T_A$, indicates adjustment of the current $N_{TA}$ value, $N_{TA,old}$, to the new $N_{TA}$ value, $N_{TA,new}$, by index values of $T_A=0, 1, 2, \ldots, 63$, where $N_{TA,new}=N_{TA,old}+(T_A-31)\times 16$. Here, adjustment of $N_{TA}$ value by a positive or a negative amount indicates advancing or delaying the uplink transmission timing by a given amount respectively.

For a timing advance command received on subframe n, the corresponding adjustment of the timing shall apply from the beginning of subframe n+6. When the UE's uplink PUCCH/PUSCH/SRS transmissions in subframe n and subframe n+1 are overlapped due to the timing adjustment, the UE shall transmit complete subframe n and not transmit the overlapped part of subframe n+1.

If the received downlink timing changes and is not compensated or is only partly compensated by the uplink timing adjustment without timing advance command as specified in TS 36.133, the UE changes $N_{TA}$ accordingly.

The eNodeB balances the overhead of sending regular timing update commands to all the UEs in the cell against a UE's ability to transmit quickly when data arrives in its transmit buffer. The eNodeB therefore configures a timer for each user equipment, which the user equipment restarts each time a timing advance update is received. This timer is also referred to as Timing Advance Timer (TAT). In case the user equipment does not receive another timing advance update before the timer expires, it must then consider that it has lost uplink synchronization (see also section 5.2 of 3GPP TS 36.321, "Evolved Universal Terrestrial Radio Access (E-UTRA); Medium Access Control (MAC) protocol specification", version 8.9.0, which is incorporated herein by reference).

In such a case, in order to avoid the risk of generating interference to uplink transmissions from other user equipments, the UE is not permitted to make another uplink transmission of any sort.

Additional properties of the timing advance procedure can be found in TS 36.321 and TS 36.133 (section 7.1) incorporated herein by reference.

LTE Device to Device (D2D) Proximity Services

Proximity-based applications and services represent an emerging social-technological trend. The identified areas include services related to commercial services and Public Safety that would be of interest to operators and users. The introduction of a Proximity Services (ProSe) capability in LTE would allow the 3GPP industry to serve this developing market, and will, at the same time, serve the urgent needs of several Public Safety communities that are jointly committed to LTE.

Device-to-Device (D2D) communication is a technology component for LTE-rel.12. The Device-to-Device (D2D) communication technology allows D2D as an underlay to the cellular network to increase the spectral efficiency. For example, if the cellular network is LTE, all data carrying physical channels use SC-FDMA for D2D signaling. In D2D communication, user equipments (UEs) transmit data signals to each other over a direct link using the cellular resources instead of through the Base Station. A possible scenario in a D2D compatible communication system is shown in FIG. 7.

D2D Communication in LTE

The "D2D communication in LTE" is focusing on two areas; Discovery and Communication whereas this invention is mostly related to the Discovery part.

Device-to-Device (D2D) communication is a technology component for LTE-A. In D2D communication, UEs transmit data signals to each other over a direct link using the cellular resources instead of through the BS. D2D users communicate directly while remaining controlled under the BS, i.e. at least when being in coverage of an eNB. Therefore D2D can improve system performances by reusing cellular resources.

It is assumed that D2D operates in uplink LTE spectrum (in the case of FDD) or uplink sub-frames of the cell giving coverage (in case of TDD except when out of coverage). Furthermore D2D transmission/reception does not use full duplex on a given carrier. From individual UE perspective, on a given carrier D2D signal reception and LTE uplink transmission do not use full duplex, i.e. no simultaneous D2D signal reception and LTE UL transmission is possible.

In D2D communication when UE1 has a role of transmission (transmitting user equipment or transmitting terminal), UE1 sends data and UE2 (receiving user equipment) receives it. UE1 and UE2 can change their transmission and reception role. The transmission from UE1 can be received by one or more UEs like UE2.

With respect to the User plane protocols, in the following the content of the agreement from D2D communication perspective is reported (3GPP TR 36.843, version 12.0.0 section 9.2, incorporated herein by reference):

PDCP:
  1: M D2D broadcast communication data (i.e. IP packets) should be handled as the normal user-plane data.
  Header-compression/decompression in PDCP is applicable for 1: M D2D broadcast communication.
    U-Mode is used for header compression in PDCP for D2D broadcast operation for public safety;

RLC:
  RLC UM is used for 1: M D2D broadcast communication.
  Segmentation and Re-assembly is supported on L2 by RLC UM.
  A receiving UE needs to maintain at least one RLC UM entity per transmitting peer UE.
  An RLC UM receiver entity does not need to be configured prior to reception of the first RLC UM data unit.
  So far no need has been identified for RLC AM or RLC TM for D2D communication for user plane data transmission.

MAC:
  No HARQ feedback is assumed for 1: M D2D broadcast communication
  The receiving UE needs to know a source ID in order to identify the receiver RLC UM entity.
  The MAC header comprises a L2 target ID which allows filtering out packets at MAC layer.
  The L2 target ID may be a broadcast, group cast or unicast address.
    L2 Groupcast/Unicast: A L2 target ID carried in the MAC header would allow discarding a received RLC UM PDU even before delivering it to the RLC receiver entity.
    L2 Broadcast: A receiving UE would process all received RLC PDUs from all transmitters and aim to re-assemble and deliver IP packets to upper layers.
  MAC sub header contains LCIDs (to differentiate multiple logical channels).
  At least Multiplexing/de-multiplexing, priority handling and padding are useful for D2D.

Resource Allocation

Radio Resource Allocation

FIG. 9 illustrates the behavior regarding resource allocation in D2D communication. The resource allocation for D2D communication is under discussion and is described in its present form in 3GPP TR 36.843, version 12.0.0, section 9.2.3, incorporated herein by reference.

From the perspective of a transmitting UE, a proximity Services enabled UE (ProSe-enabled UE) can operate in two modes for resource allocation:

Mode 1 (eNB scheduled resource allocation): eNodeB or Release-10 relay node schedules the exact resources used by a UE to transmit direct data and direct control information. The UE needs to be RRC_CONNECTED in order to transmit data. Further, the UE requests transmission resources from the eNB and the eNB schedules transmission resources for transmission of scheduling assignment(s) and data. The UE sends a scheduling request (D-SR or Random Access) to the eNB followed by a BSR. Based on the BSR the eNB can determine that the UE has data for a ProSe Direct Communication transmission and estimate the resources needed for transmission.

Mode 2 (UE autonomous resource selection): a UE on its own selects resources from resource pools to transmit direct data and direct control information What resource allocation mode a UE is going to use for D2D data communication depends basically on the RRC state, i.e. RRC_IDLE or RRC_CONNECTED, and the coverage state of the UE, i.e. in-coverage, out-of-coverage. A UE is considered in-coverage if it has a serving cell (i.e. the UE is RRC_CONNECTED or is camping on a cell in RRC_IDLE).

Specifically, the following rules with respect to the resource allocation mode apply for the UE (according to TS 36.300):

If the UE is out-of-coverage it can only use mode 2;
  If the UE is in-coverage it may use mode 1 if the eNB configures it accordingly;
  If the UE is in-coverage it may use mode 2 if the eNB configures it accordingly;
  When there are no exceptional conditions, UE changes from Mode 1 to Mode 2 or mode 2 to mode 1 only if it is configured by eNB to do so. If the UE is in-coverage it shall use only the mode indicated by eNB configuration unless one of the exceptional cases occurs;
  The UE considers itself to be in exceptional conditions while T311 or T301 is running;
  When an exceptional case occurs the UE is allowed to use mode 2 temporarily even though it was configured to use mode 1.
  While being in the coverage area of an E-UTRA cell, the UE shall only perform ProSe Direct Communication Transmission on the UL carrier only on the resources assigned by that cell, even if resources of that carrier have been pre-configured e.g. in UICC.
  For UEs in RRC_IDLE UEs the eNB may select one of the following options:
    The eNB may provide a Mode 2 transmission resource pool in SIB. UEs that are authorized for Prose Direct Communication use these resources for ProSe Direct Communication in RRC_IDLE;

The eNB may indicate in SIB that it supports D2D but does not provide resources for ProSe Direct Communication. UEs need to enter RRC_CONNECTED to perform ProSe Direct Communication transmission.

For UEs in RRC_CONNECTED:

A UE in RRC_CONNECTED that is authorized to perform ProSe Direct Communication transmission, when it needs to perform ProSe Direct Communication transmission indicates to the eNB that it wants to perform ProSe Direct Communication transmissions;

The eNB validates whether the UE in RRC_CONNECTED is authorized for ProSe Direct Communication transmission using the UE context received from MME;

The eNB may configure a UE in RRC_CONNECTED by dedicated signaling with a mode 2 resource allocation transmission resource pool that may be used without constraints while the UE is RRC_CONNECTED. Alternatively, the eNB may configure a UE in RRC_CONNECTED by dedicated signaling with a mode 2 resource allocation transmission resource pool which the UE is allowed to use only in exceptional cases and rely on mode-1 otherwise.

In Mode 1, a UE requests transmission resources from an eNodeB. The eNodeB schedules transmission resources for transmission of scheduling assignment(s) and data.

The UE sends a scheduling request (D-SR or RA) to the eNodeB followed by a BSR based on which the eNodeB can determine that the UE intends to perform a D2D transmission as well as the required amount resources.

In Mode 1, the UE needs to be RRC Connected in order to transmit D2D communication.

For Mode 2, UEs are provided with a resource pool (time and frequency) from which they choose resources for transmitting D2D communication.

FIG. 8 schematically illustrates the Overlay (LTE) and the Underlay (D2D) transmission and/or reception resources. The eNodeB controls whether the UE may apply Mode 1 or Mode 2 transmission. Once the UE knows its resources where it can transmit (or receive) D2D communication, it uses the corresponding resources only for the corresponding transmission/reception. In the example of FIG. 8, the D2D subframes will only be used to receive or transmit the D2D signals. Since the UE as a D2D device would operate in Half Duplex mode, it can either receive or transmit the D2D signals at any point of time. Similarly, in the same figure, the other subframes can be used for LTE (overlay) transmissions and/or reception.

D2D discovery is the procedure/process of identifying other D2D capable and interested devices in the vicinity. For this purpose, the D2D devices that want to be discovered would send some discovery signals (on certain network resources) and the receiving UE interested in the said discovery signal will come to know of such transmitting D2D devices. Ch. 8 of 3GPP TR 36.843 describes the available details of D2D Discovery mechanisms.

Transmission Procedure for D2D Communication

FIG. 10 schematically shows a transmission procedure for D2D communication. The D2D data transmission procedure differs depending on the resource allocation mode. As described above for mode 1 the eNB explicitly schedules the resources for Scheduling assignment and D2D data communication. In the following the different steps of the request/grant procedure is listed for model resource allocation:

Step 1 UE sends SR (Scheduling Request) to eNB via PUCCH;
Step 2 eNB grants UL resource (for UE to send BSR) via PDCCH, scrambled by C-RNTI;
Step 3 UE sends D2D BSR indicating the buffer status via PUSCH;
Step 4 eNB grants D2D resource (for UE to send data) via PDCCH, scrambled by D2D-RNTI.
Step 5 D2D Tx UE transmits SA/D2D data according to grant received in step 4.

A Scheduling Assignment (SA) is a compact (low-payload) message containing control information, e.g., pointer(s) to time-frequency resources for the corresponding D2D data transmissions. The content of the SA is basically the grant received in Step 4 above. The exact details of the D2D grant and SA content are not fixed yet.

D2D Discovery

ProSe (Proximity based Services) Direct Discovery is defined as the procedure used by the ProSe-enabled UE to discover other ProSe-enabled UE(s) in its proximity using E-UTRA direct radio signals via the PC5 interface. FIG. 11 schematically illustrates a PC5 interface for device to device direct discovery, as described in 3GPP TS 23.303 V12.0.0, section 5.1.1.4 which is enclosed herein by reference.

Upper layer handles authorization for announcement and monitoring of discovery information. For the purpose, UEs have to exchange predefined signals, referred to as discovery signals. By checking discovery signals periodically, a UE maintains a list of proximity UEs in order to establish communication link when it is needed. Discovery signals should be detected reliably, even in low Signal-to-Noise Ratio (SNR) environments. To allow discovery signals to be transmitted periodically, resources for Discovery signals should be assigned.

There are two types of ProSe Direct Discovery: open and restricted. Open is the case where there is no explicit permission that is needed from the UE being discovered, whereas restricted discovery only takes place with explicit permission from the UE that is being discovered.

ProSe Direct Discovery can be a standalone service enabler in a discovering UE, which enables the discovering UE to use information from a discovered UE for certain applications. As an example, the information transmitted in ProSe Direct Discovery may be "find a taxi nearby", "find me a coffee shop", "find me the nearest police station" and the like. Through ProSe Direct Discovery a discovery UE can retrieve needed information. Additionally, depending on the information obtained, ProSe Direct Discovery can be used for subsequent actions in the telecommunication system, such as, for example, initiating ProSe Direct Communication.

ProSe Direct Discovery Models

ProSe Direct Discovery is based on several discovery models. The models for ProSe Direct Discovery are defined in 3GPP TS 23.303 V12.0.0, section 5.3.1.2 which is enclosed herein by reference:

Model a ("I am Here")

Model A is also indicated as "I am here", since the announcing UE broadcasts information about itself, such as its ProSe Application Identities or ProSe UE Identities in the discovery message, thereby identifying itself and communicating to the other parties of the communication system that it is available.

According to Model A two roles for ProSe-enabled UEs that are participating in ProSe Direct Discovery are defined. ProSe-enabled UE can have the function of Announcing UE and Monitoring UE. An announcing UE announces certain information that could be used by UEs in proximity that have permission to discover. A Monitoring UE monitors certain information of interest in proximity of announcing UEs.

In this model the announcing UE broadcasts discovery messages at pre-defined discovery intervals and the monitoring UEs that are interested in these messages read them and process them.

Model B ("Who is There?"/"are You There?")

This model defines two roles for the ProSe-enabled UEs that are participating in ProSe Direct Discovery:

Discoverer UE: The UE transmits a request containing certain information about what it is interested to discover;

Discoveree UE: The UE that receives the request message can respond with some information related to the discoverer's request.

Model B is equivalent to "who is there/are you there" since the discoverer UE transmits information about other UEs that would like to receive responses from. The transmitted information can be, for example, about a ProSe Application Identity corresponding to a group. The members of the group can respond to said transmitted information.

According to this model two roles for the ProSe-enabled UEs that are participating in ProSe Direct Discovery are defined: discoverer UE and discoveree UE. The discoverer UE transmits a request containing certain information about what it is interested to discover. On the other hand, the discoveree UE receives the request message can respond with some information related to the discoverer's request.

The content of discovery information is transparent to Access Stratum (AS), which does not know the content of discovery information. Thus, no distinction is made in the Access Stratum between the various ProSe Direct Discovery models and types of ProSe Direct Discovery. The ProSe Protocol ensures that it delivers only valid discovery information to AS for announcement.

The UE can participate in announcing and monitoring of discovery information in both RRC_IDLE and RRC_CONNECTED state as per eNB configuration. The UE announces and monitors its discovery information subject to the half-duplex constraints.

Types of Discovery

FIG. 12 illustrates a diagram showing the IDLE and CONNECTED mode in the reception of discovery resources in D2D communication.

D2D communication may either be network-controlled where the operator manages the switching between direct transmissions (D2D) and conventional cellular links, or the direct links may be managed by the devices without operator control. D2D allows combining infrastructure-mode and ad hoc communication.

Generally device discovery is needed periodically. Further D2D devices utilize a discovery message signalling protocol to perform device discovery. For example, a D2D-enabled UE can transmit its discovery message and another D2D enabled UE receives this discovery message and can use the information to establish a communication link. An advantage of a hybrid network is that if D2D devices are also in communication range of network infrastructure, network entity like eNB can additionally assist in the transmission or configuration of discovery messages. Coordination/control by the eNB in the transmission or configuration of discovery messages is also important to ensure that D2D messaging does not create interference to the cellular traffic controlled by the eNB. Additionally, even if some of the devices are outside of the network coverage range, in-coverage devices can assist in the ad-hoc discovery protocol.

At least the following two types of discovery procedure are defined for the purpose of terminology definition used further in the description.

Type 1: A resource allocation procedure where resources for announcing of discovery information are allocated on a non UE specific basis, further characterized by:

The eNB provides the UE(s) with the resource pool configuration used for announcing of discovery information. The configuration may be signalled in SIB.

The UE autonomously selects radio resource(s) from the indicated resource pool and announce discovery information.

The UE can announce discovery information on a randomly selected discovery resource during each discovery period.

Type 2: A resource allocation procedure where resources for announcing of discovery information are allocated on a per UE specific basis, further characterized by:

The UE in RRC_CONNECTED may request resource(s) for announcing of discovery information from the eNB via RRC. The eNB assigns resource(s) via RRC.

The resources are allocated within the resource pool that is configured in UEs for monitoring.

The resources are according to the type 2 procedure for example allocated semi-persistently allocated for discovery signal transmission.

In the case UEs are in RRC_IDLE modus, the eNB may select one of the following options:

The eNB may provide a Type 1 resource pool for discovery information announcement in SIB. UEs that are authorized for Prose Direct Discovery use these resources for announcing discovery information in RRC_IDLE.

The eNB may indicate in SIB that it supports D2D but does not provide resources for discovery information announcement. UEs need to enter RRC Connected in order to request D2D resources for discovery information announcement.

For UEs in RRC_CONNECTED status, a UE authorized to perform ProSe Direct Discovery announcement indicates to the eNB that it wants to perform D2D discovery announcement. Then, the eNB validates whether the UE is authorized for ProSe Direct Discovery announcement using the UE context received from MME. The eNB may configure the UE to use a Type 1 resource pool or dedicated Type 2 resources for discovery information announcement via dedicated RRC signalling (or no resource). The resources allocated by the eNB are valid until a) the eNB de-configures the resource (s) by RRC signalling or b) the UE enters IDLE.

Receiving UEs in RRC_IDLE and RRC_CONNECTED monitor both Type 1 and Type 2 discovery resource pools as authorised. The eNB provides the resource pool configuration used for discovery information monitoring in SIB. The SIB may contain discovery resources used for announcing in neighbour cells as well.

Radio Protocol Architecture

FIG. 13 schematically illustrates a Radio Protocol Stack (AS) for ProSe Direct Discovery.

The AS layer interfaces with upper layer (ProSe Protocol). Accordingly, the MAC layer receives the discovery information from the upper layer (ProSe Protocol). In this context, the IP layer is not used for transmitting the discovery information. Further, the AS layer has a scheduling function: the MAC layer determines the radio resource to be used for announcing the discovery information received from upper layer. In addition, the AS layer has the function of generating Discovery PDU: the MAC layer builds the MAC PDU carrying the discovery information and sends the MAC PDU to the physical layer for transmission in the determined radio resource. No MAC header is added.

In the UE, the RRC protocol informs the discovery resource pools to MAC. RRC also informs allocated Type 2 resource for transmission to MAC. There is no need for a MAC header. The MAC header for discovery does not comprise any fields based on which filtering on Layer 2 could be performed. Discovery message filtering at the MAC level does not seem to save processing or power compared to performing filtering at the upper layers based on the ProSe UE- and/or ProSe Application ID. The MAC receiver forwards all received discovery messages to upper layers. MAC will deliver only correctly received messages to upper layers.

In the following it is assumed that L1 indicates to MAC whether a discovery messages has been received correctly. Further, it is assumed that the Upper Layers guarantee to deliver only valid discovery information to the Access Stratum.

Prior art solution for allocation of resources for discovery in D2D systems, do not allow determining a resource pattern or a configuration suitable for allocating resources in a manner that is suitable for the requested D2D service. Specifically, based on the information transmitted by the D2D capable device according to common signaling procedures, the base station could allocate the transmission resources for a too short time period for allowing the UE to broadcast the complete discovery information. Consequently, the transmitting UE needs to request resources again, thereby leading to an increase of signaling overhead into the LTE system.

Moreover, for example information on the content of discovery information is transparent to the Access Stratum (AS). Therefore, no distinction is made in the Access Stratum between the various ProSe Direct Discovery models and types of ProSe Direct Discovery and the base station would not receive any information useful for determining the model of discovery transmission and the type of preferred procedure for allocating discovery resources.

D2D Synchronization

The main task of synchronization is to enable the receivers to acquire a time and frequency reference. Such reference may be exploited for at least two goals: 1) aligning the receiver window and frequency correction when detecting D2D channels and 2) aligning the transmitter timing and parameters when transmitting D2D channels. Following channels have been defined in 3GPP so far for the purpose of synchronization D2DSS D2D Synchronization Signal
PD2DSCH Physical D2D Synchronization Channel
PD2DSS Primary D2D Synchronization Signal
SD2DSS Secondary D2D Synchronization Signal Furthermore the following terminology with respect to synchronization was agreed in 3GPP.

D2D Synchronization Source: A node that at least transmits a D2D synchronization signal.

D2D Synchronization Signal: A signal from which a UE can obtain timing and frequency synchronization A D2D synchronization source can be basically an eNB or an D2D UE.

D2D synchronization could be seen as a procedure which is similar to LTE cell search. In order to allow both NW control and efficient synchronization for partial/outside coverage scenarios, the following procedure is currently under discussion within 3GPP.

Receiver Synchronization

The ProSe enabled UE regularly searches for LTE cells (according to LTE mobility procedures) and for D2DSS/PD2DSCH transmitted by SS UEs.

If any suitable cell is found, the UE camps on it and follows the cell synchronization (according to LTE legacy procedures).

If any suitable D2DSS/PD2DSCH transmitted by SS UEs are found, the UE synchronizes its receiver to all incoming D2DSS/PD2DSCH (subject to UE capabilities) and monitors them for incoming connections (Scheduling Assignments). It should be noted that the D2DSS transmitted by a D2D Synchronization Source which is an eNodeB shall be the Rel-8 PSS/SSS. D2D Synchronization Sources which are eNodeBs have a higher priority than D2D Synchronization Sources which are UEs.

Transmitter Synchronization

The ProSe enabled UE regularly searches for LTE cells (according to LTE mobility procedures) and for D2DSS/PD2DSCH transmitted by SS UEs;

If any suitable cell is found, the UE camps on it and follows the cell synchronization for D2D signals transmission, the NW may configure the UE to transmit D2DSS/PD2DSCH following the cell synchronization.

If no suitable cell is found, the UE verifies if any of the incoming D2DSS/PD2DSCH may be relayed further (i.e., the max hop count has not been reached), then (a) if an incoming D2DSS/PD2DSCH that may be relayed further is found, the UE adapts its transmitter synchronization to it and transmits D2DSS/PD2DSCH accordingly; or (b) if an incoming D2DSS/PD2DSCH that may be relayed further is NOT found, the UE acts as independent synchronization source and transmit D2DSS/PD2DSCH according to any internal synchronization reference.

Further details on the synchronization procedure for D2D can be found in TS 36.843.

SUMMARY OF THE INVENTION

One exemplary embodiment provides a transmitting terminal for transmitting data to a receiving terminal over a direct link connection in a communication system is given. The transmitting terminal is adapted to determine the transmission timing of the direct link data transmission in the communication system and comprises a receiving unit adapted to receive from the base station an uplink control information message including a timing command for adjusting an uplink transmission timing value for data transmissions to the base station. A generating unit is configured to generate direct link timing information, based on the uplink transmission timing value used for uplink transmissions to the base station, the direct link timing information being usable for generating a direct link transmission timing value for determining the timing of the data transmission over the direct link. A transmitting unit transmits to the receiving terminal the generated direct link timing information, the direct link timing information being usable at the receiving terminal for generating a direct link reception timing value for determining the reception timing of data to be received on the direct link from the transmitting terminal.

Additional benefits and advantages of the disclosed embodiments will be apparent from the specification and figures. The benefits and/or advantages may be individually provided by the various embodiments and features of the specification and drawings disclosure, and need not all be provided in order to obtain one or more of the same.

BRIEF DESCRIPTION OF THE FIGURES

In the following the exemplary embodiments will be described in more detail in reference to the attached figures and drawings. Similar or corresponding details in the figures are marked with the same reference numerals.

FIG. 7 is a schematic illustration showing a system including D2D capable user equipments;

FIG. 8 is a schematic illustration showing the overlay (LTE) and the Underlay (D2D) transmission and reception resources in D2D subframes;

FIG. 13 schematically illustrates a Radio Protocol Stack (AS) for ProSe Direct Discovery;

FIG. 14 illustrates a scheme for controlling transmission timing for transmitting data from a transmitting UE to a receiving UE over a direct link connection;

DETAILED DESCRIPTION

Figure 1:
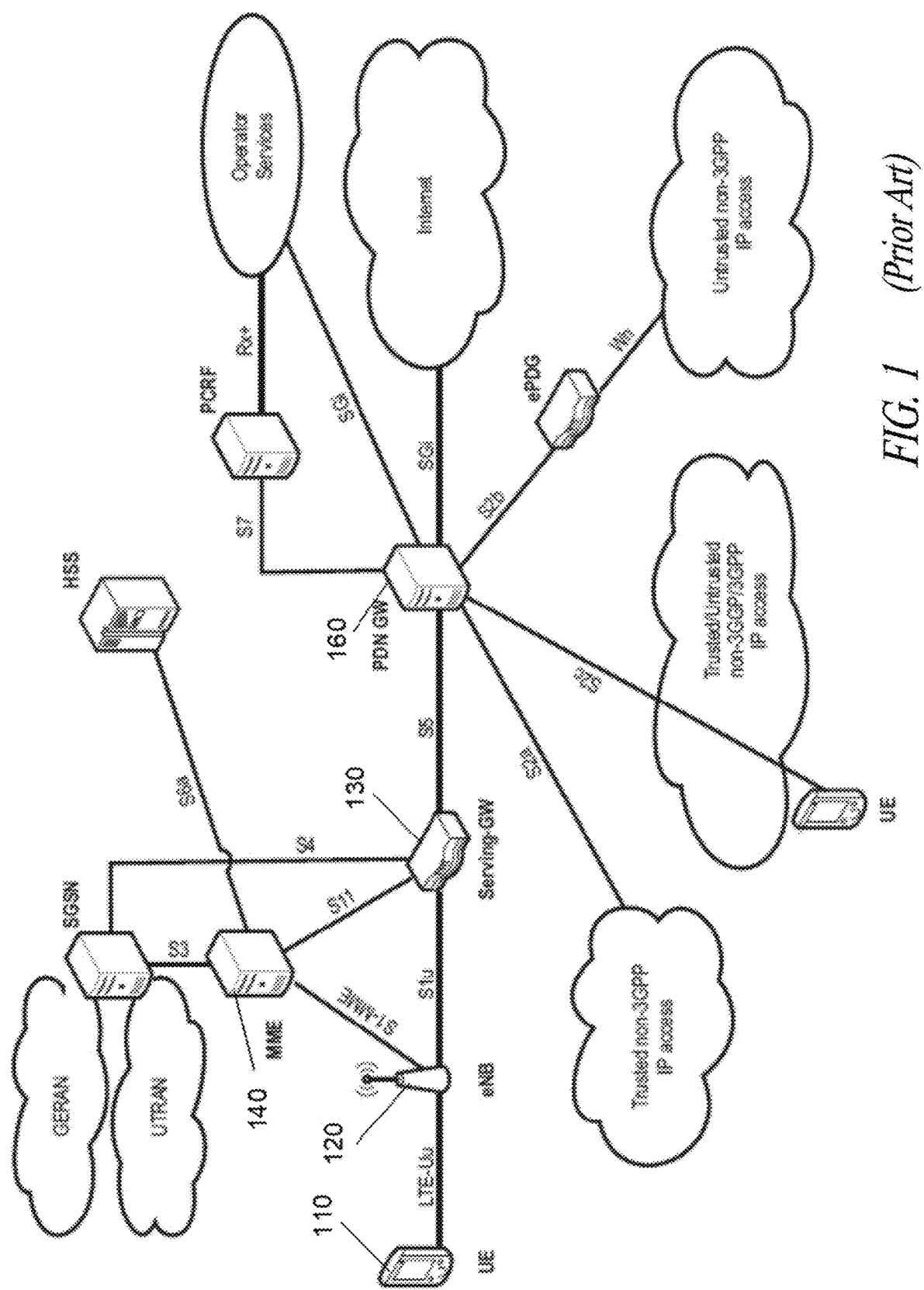
FIG. 1 shows an exemplary architecture of a 3GPP LTE system.
Figure 2:
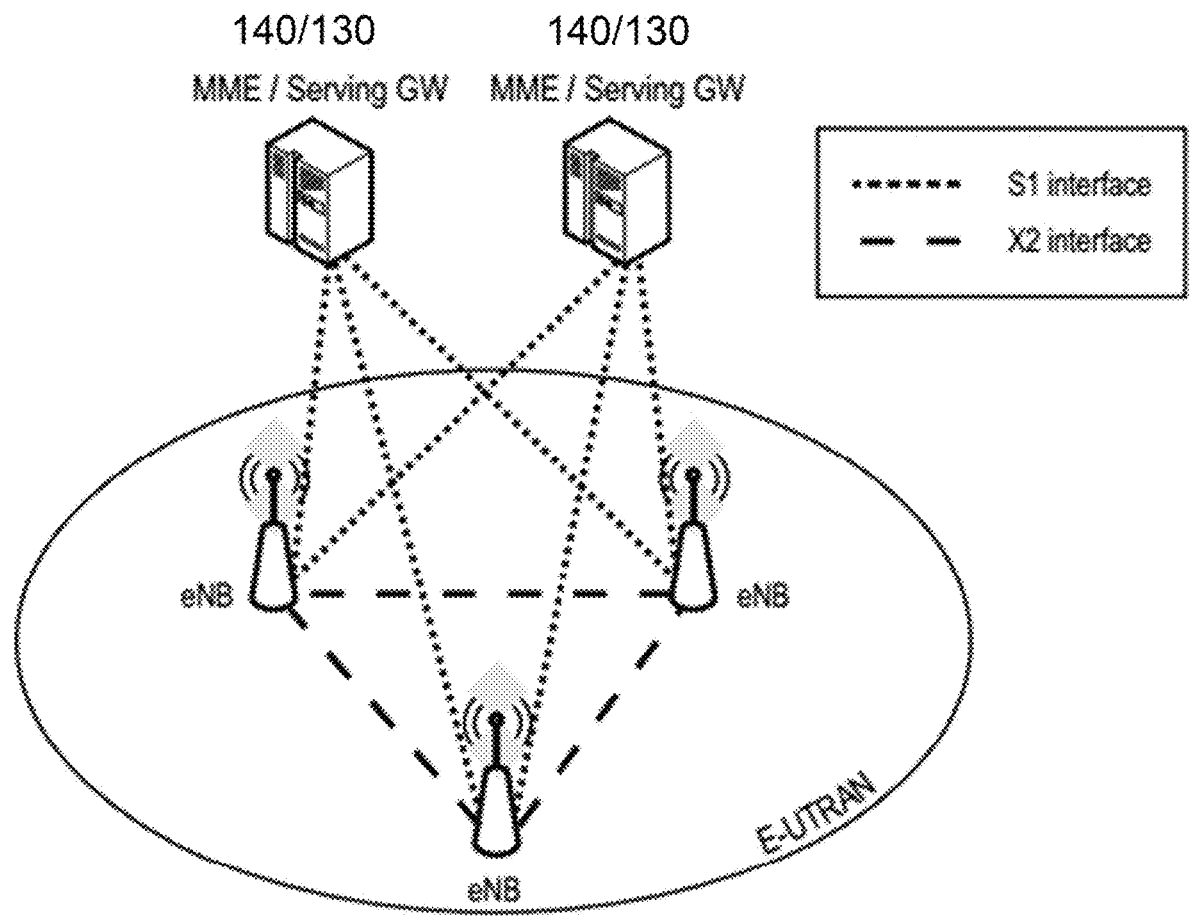
FIG. 2 shows an exemplary overview of the overall E-UTRAN architecture of 3GPP LTE.
Figure 3:
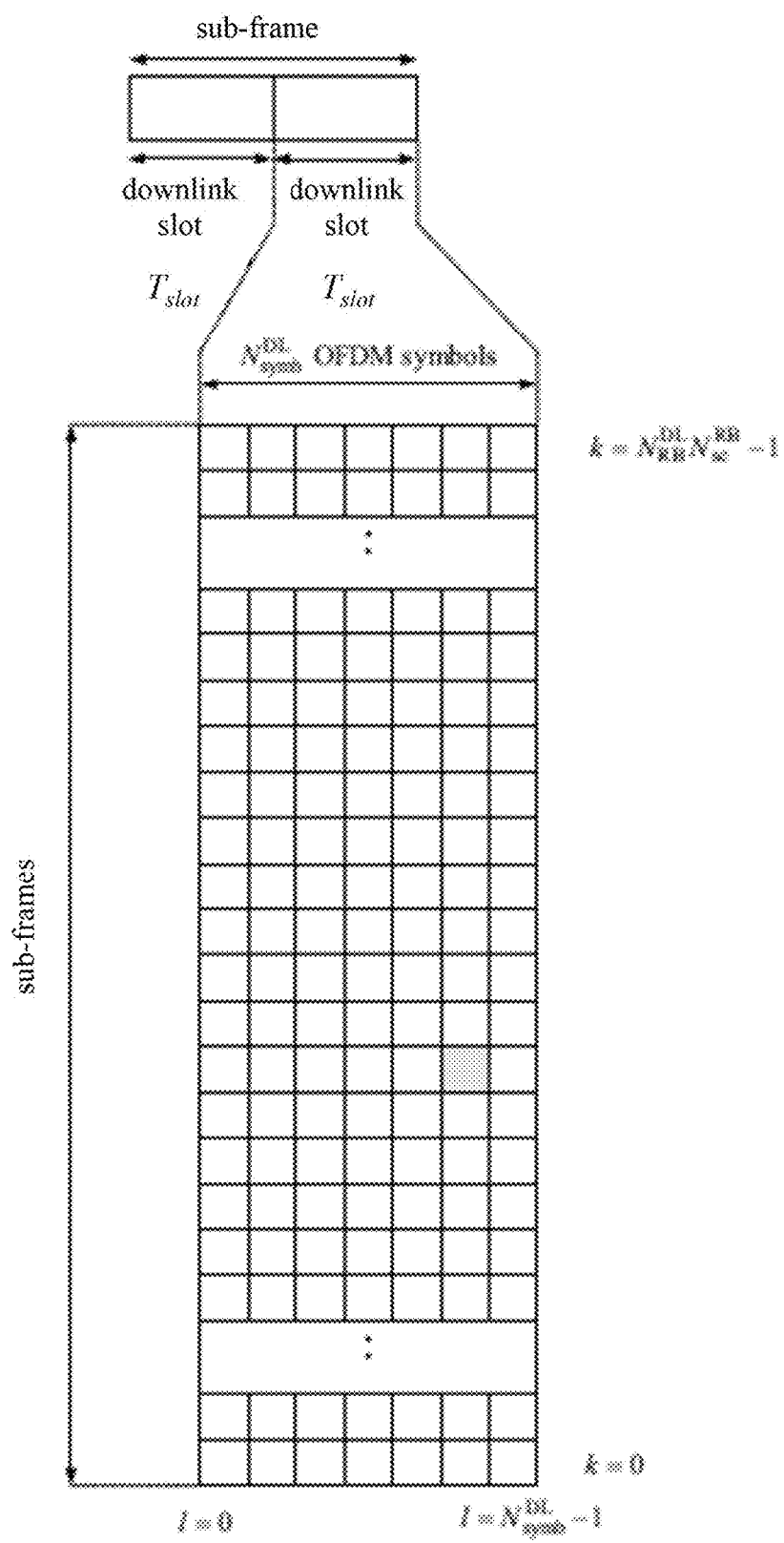
FIG. 3 shows exemplary subframe boundaries on a downlink component carrier as defined for 3GPP LTE (Release 8/9)
Figure 4:
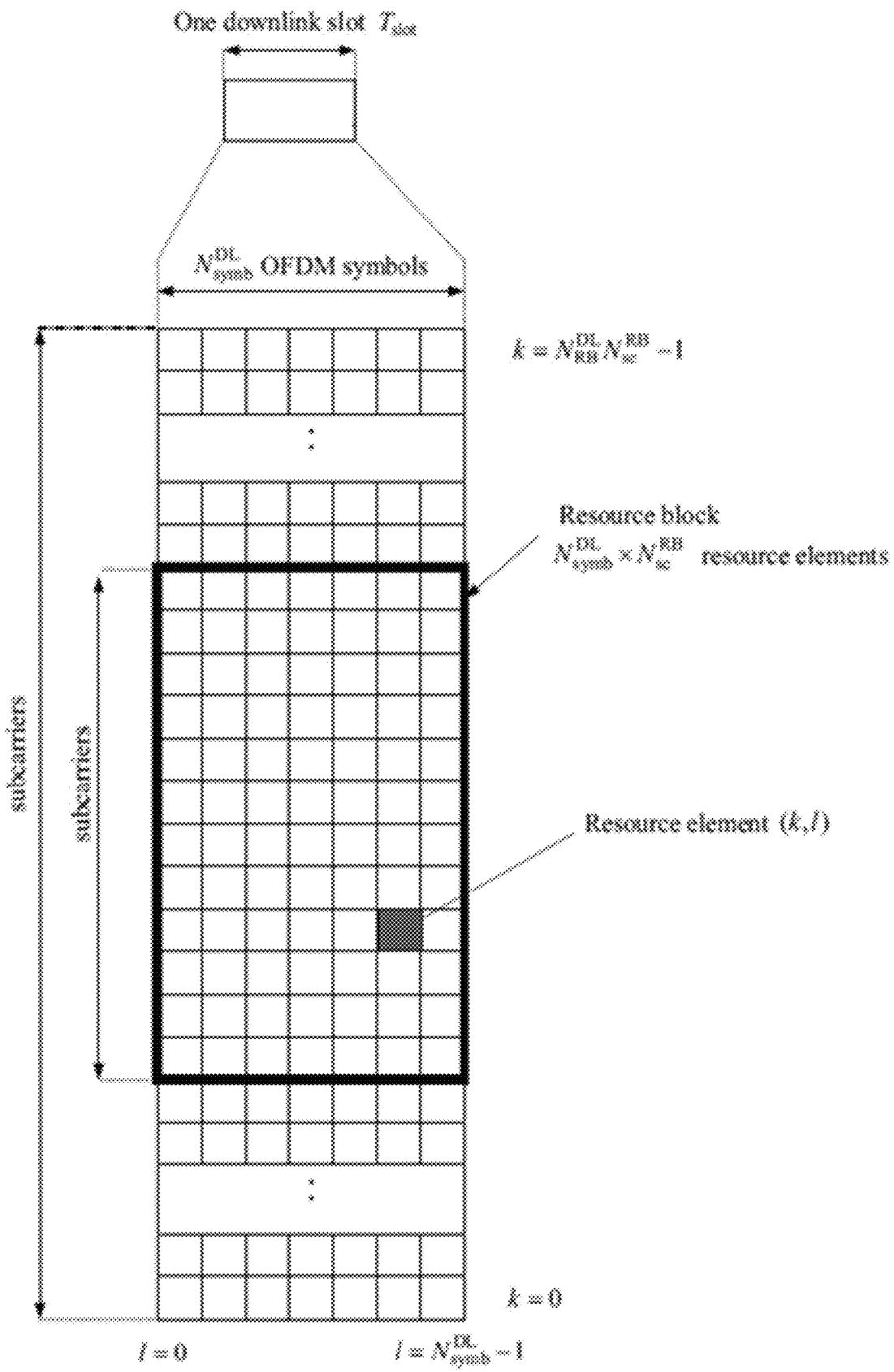
FIG. 4 shows an exemplary downlink resource grid of a downlink slot as defined for 3GPP LTE (Release 8/9)
Figure 5:
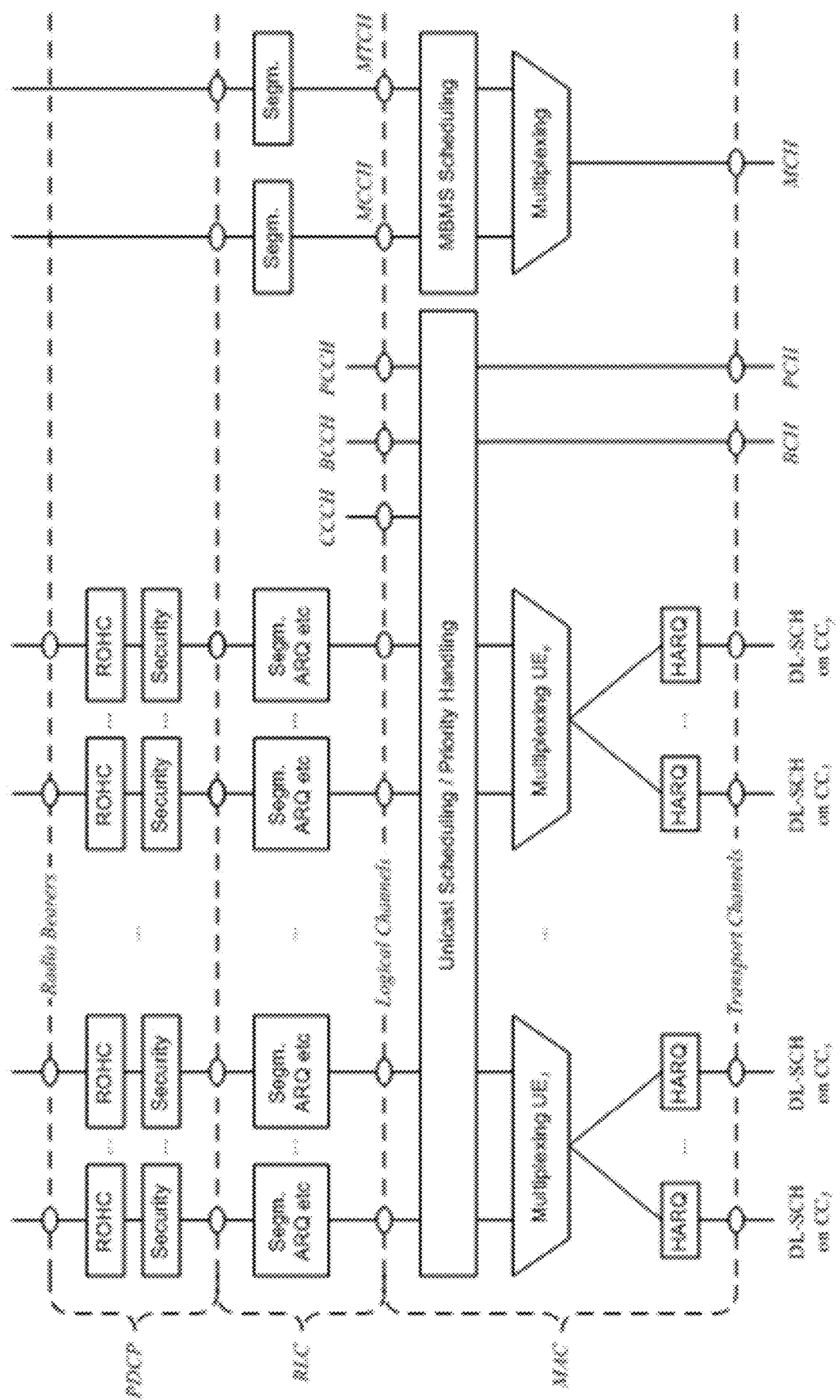
FIGS. 5 and 6 show the 3GPP LTE-A (Release 10) Layer 2 structure with activated carrier aggregation for the downlink and uplink, respectively.
Figure 6:
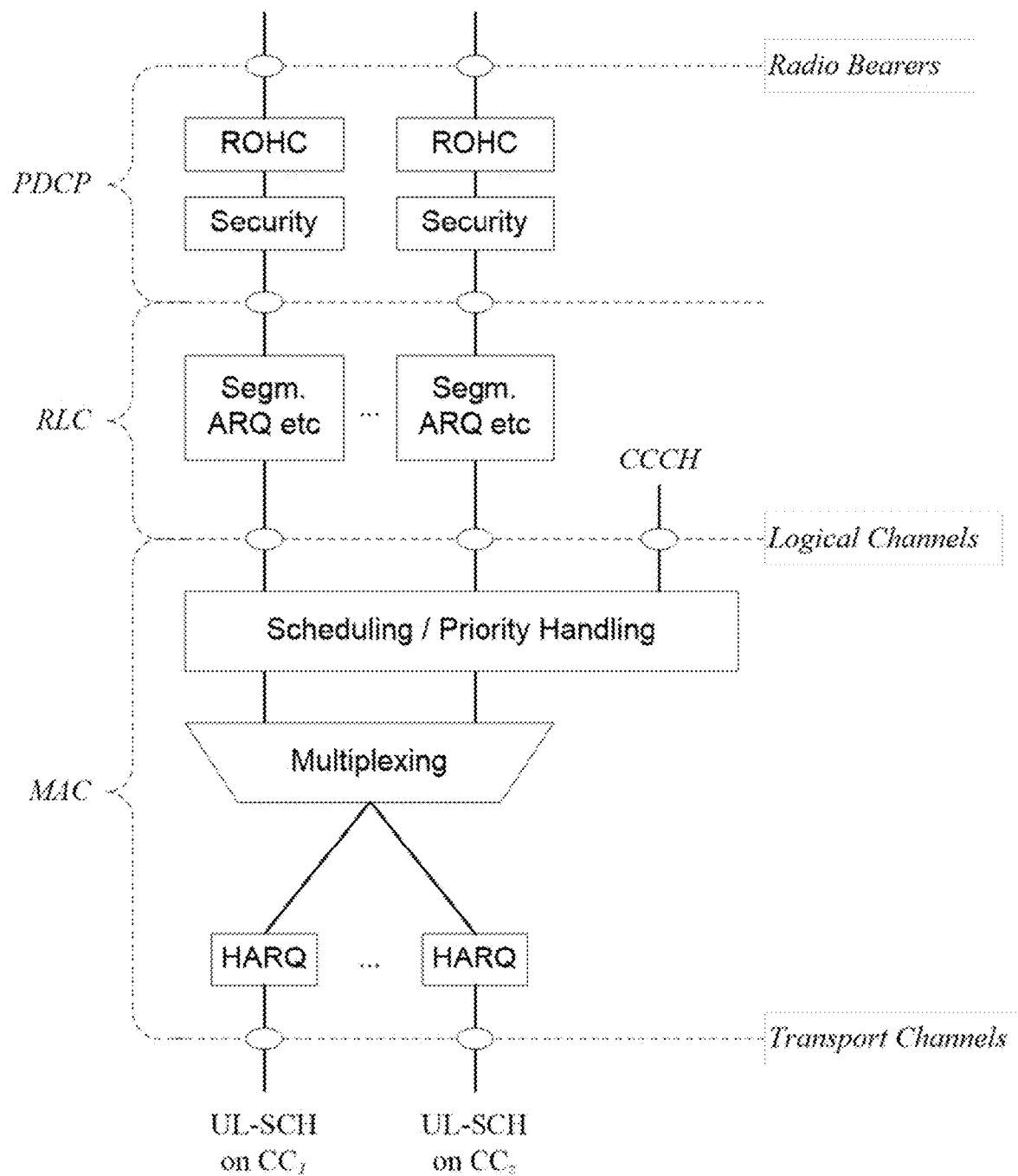
Figure 9:
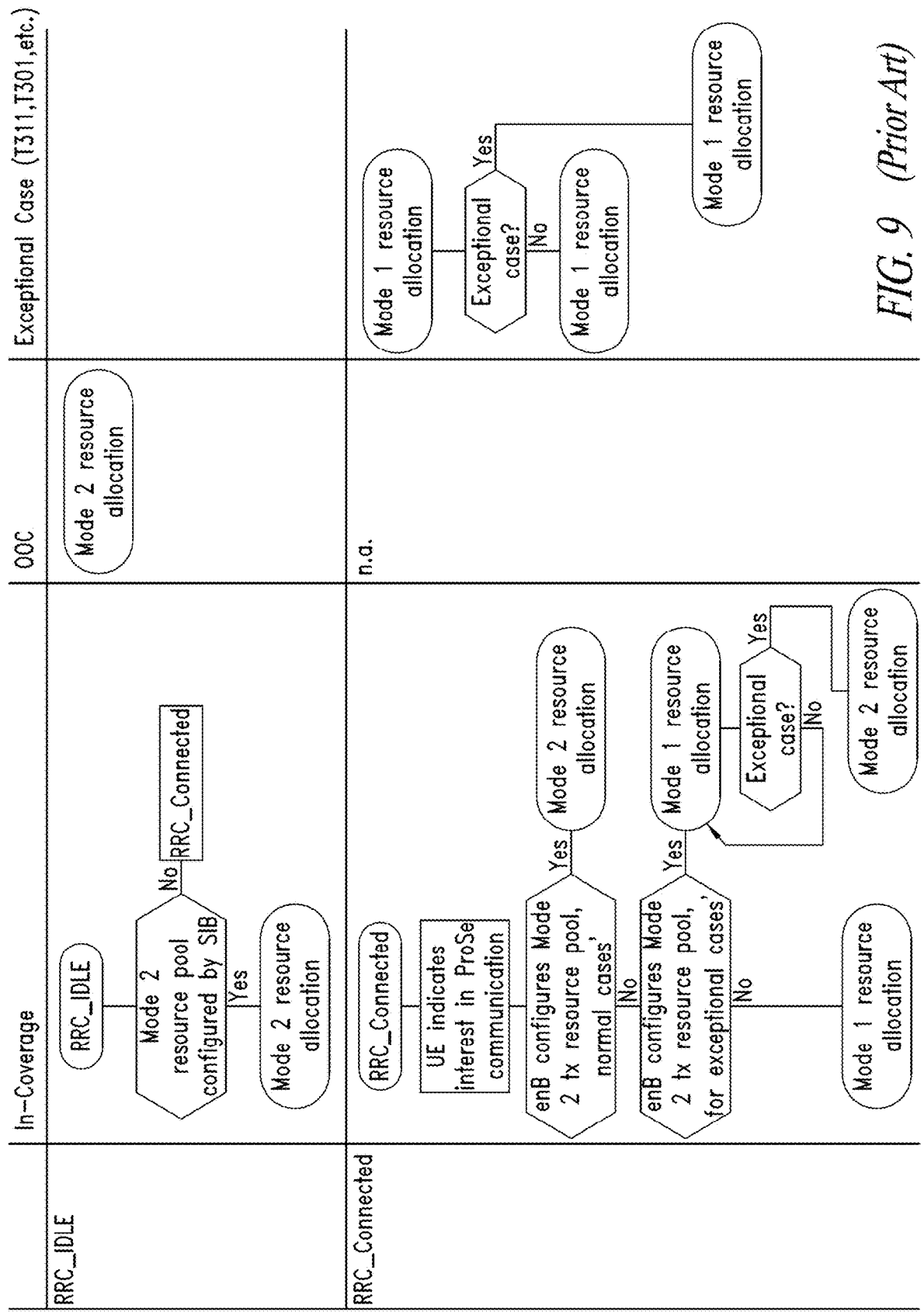
FIG. 9 illustrates the behavior regarding resource allocation in D2D communication.
Figure 10:
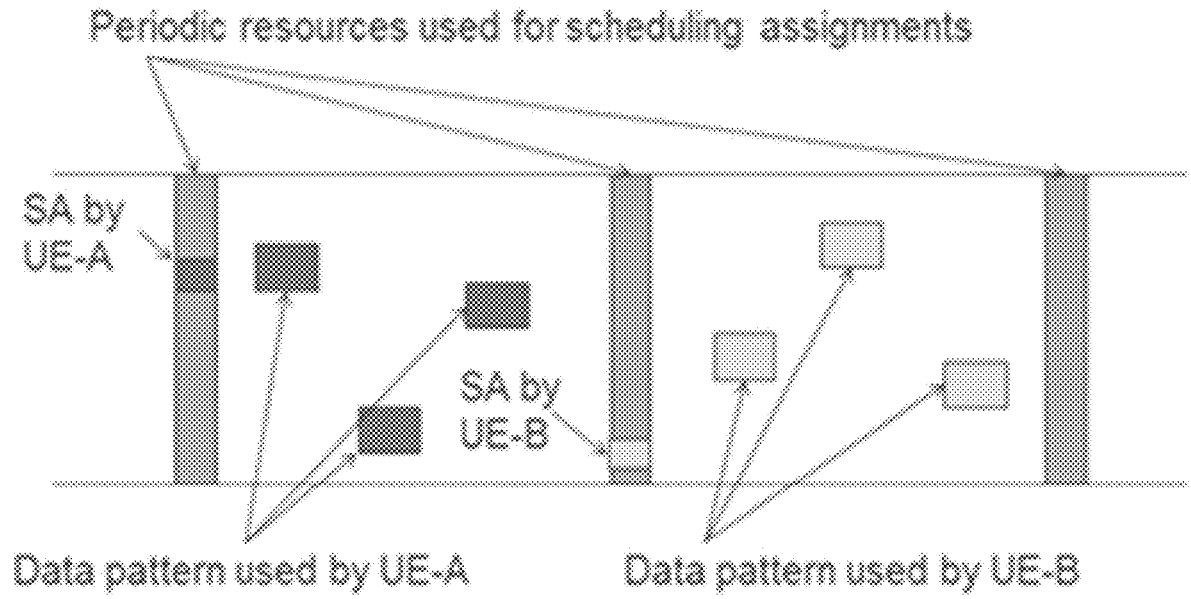
FIG. 10 schematically shows a transmission procedure for D2D communication.
Figure 11:
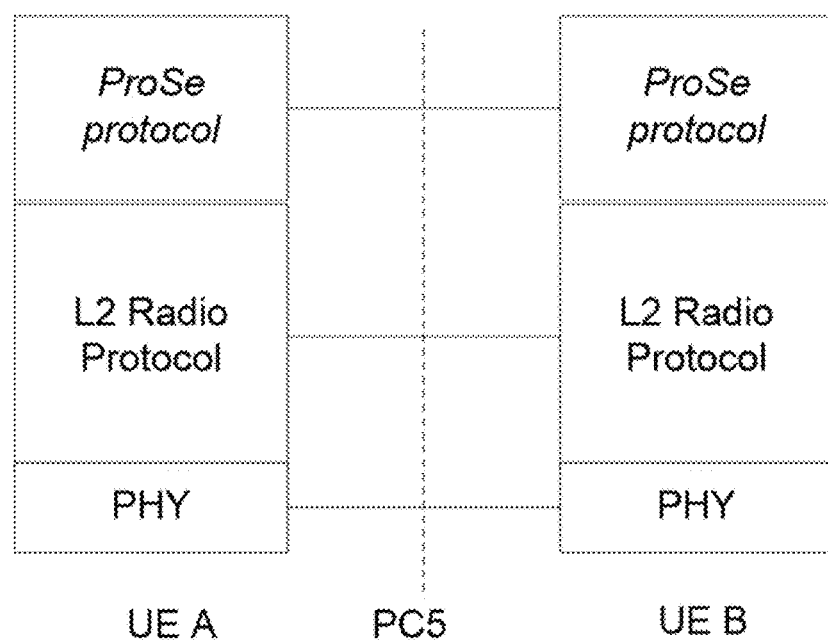
FIG. 11 shows a schematic representation of the PC5 interface for device to device direct discovery and a schematic representation of the Radio Protocol Stack for ProSe Direct Discovery.
Figure 12:
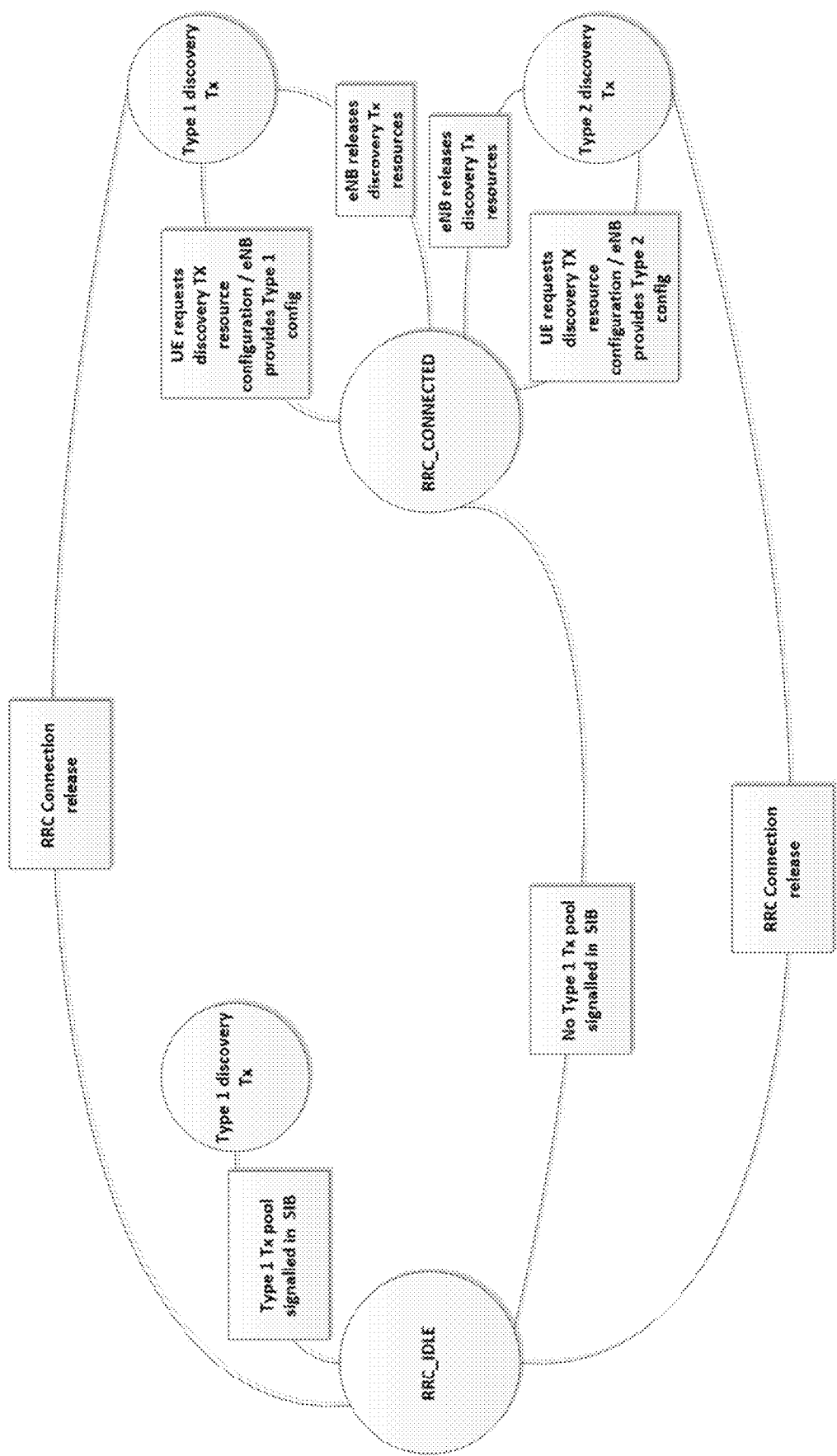
FIG. 12 is a diagram showing the IDLE and CONNECTED mode in the reception of discovery resources according to an exemplary development.

The following paragraphs will describe various exemplary embodiments. For exemplary purposes only, most of the embodiments are outlined in relation to a radio access scheme according to 3GPP LTE (Release 8/9) and LTE-A (Release 10/11/12) mobile communication systems, partly discussed in the Technical Background section above. It should be noted that the exemplary embodiments may be advantageously used, for example, in a mobile communication system such as 3GPP LTE-A (Release 10/11/12) communication systems as described in the Technical Background section above, but the exemplary embodiments are not limited to their use in this particular exemplary communication networks.

The term "direct link" used in the claims and in the description is to be understood as a communication link (communication channel) between two D2D user equipments, which allows the exchange of data directly without the involvement of the network. In other words, a communication channel is established between two user equipments in the communication system, which are close enough for directly exchanging data, bypassing the eNodeB (base station). This term is used in contrast with "LTE link" or "LTE (uplink) traffic", which instead refers to data traffic between user equipments managed by the eNodeB.

The term "transmitting user equipment" or "transmitting terminal" used in the claims and in the description is to be understood as a mobile device capable of transmitting and receiving data. The adjective transmitting is only meant to clarify a temporary operation. The transmitting user equipment in the following and for the purpose of discovery transmission can be an announcing user equipment or a discovering user equipment (discoverer). The term is used in contrast to "receiving user equipment" or "receiving terminal", which refers to a mobile device temporarily performing the operation of receiving data. The receiving user equipment in the following and for the purpose of discovery transmission can be a monitoring user equipment or a User equipment to be discovered (discoveree).

In the following, several examples will be explained in detail. The explanations should not be understood as limiting the invention, but as a mere exemplary embodiments to better understand the invention. A skilled person should be aware that the general principles as laid out in the claims can be applied to different scenarios and in ways that are not explicitly described herein. Correspondingly, the following scenario assumed for explanatory purposes of the various embodiments shall not be limiting as such.

The present invention is based on the observation that in a D2D communication system the synchronization of transmission and reception of data transmitted from a transmitting terminal to a receiving terminal over a direct link assumes an important relevance. Specifically it is important that the receiving terminal can set a reception window, more in particular the FFT window, in time for receiving data from the transmitting terminal, which is as close as possible to the time at which the transmitting terminal transmits data over the direct link connection plus the propagation delay between the transmitting and receiving terminal. If the data transmitted over the direct link is not received at the correct timing, i.e. the receiving FFT window is not positioned at the correct timing, the SNR will decrease, thereby causing a deterioration of the performance of the data transmission. In particular for cases where the timing mismatch exceeds the cyclic prefix length, i.e. the reception is out the CP, the decoding performance would be significantly reduced, e.g. it might not be possible to correctly decode the data. In addition, in order to reduce intra cell interferences in the communication system, it would be advantageous if the data transmission over the direct link were synchronized with LTE data transmission, i.e. LTE data and direct link data is received with the same timing at the base station, or in other words with the data traffic in uplink between the terminals and the base station.

FIG. 14 illustrates a possible scheme for controlling transmission timing for transmitting data from a transmitting UE (from now on UE1) to a receiving UE (from now on UE2) over a direct link connection. A solution that allows reducing intra cell interference consists in using, at the transmitting UE, for the data transmission over the direct link the same uplink timing as used by the transmitting UE for uplink data transmissions to the base station. The uplink timing is, as explained before in section "time advance", controlled by the eNB by means of Timing advance (TA) commands based on which the UE1 can adjusts its internal timing advance value to an 11 bit value, called $N_{TA}$ value.

According to the solution illustrated in FIG. 14, therefore, the transmitting UE uses the LTE uplink timing also for D2D data transmissions. Specifically, the $N_{TA}$ value, which is used by the UE1 for adjusting transmission timing for transmitting data to the base station and over the direct link is also used as a basis for synchronizing the t FFT windows of the receiving UEs, i.e. UE2.

Specifically, UE1 will maintain the 11 bit $N_{TA}$ value which will be then used for determining the timing advance with respect to the downlink reception timing. A timing advance value is sent to the receiving UEs, e.g. UE2 in this example, in a control message, also referred to as scheduling assignment (SA) message, which is however 6 bits. Therefore, the UE1 downsamples the 11 bit $N_{TA}$ value for uplink transmissions to 6 bits before transmitting same within the SA message to the UE2. As an example of downsampling, the UE1 may transmit to the UE2 only the 6 most significant bits of the uplink $N_{TA}$ value.

FIG. 14 shows different timings, represented on the horizontal lines for the eNb, for the UE1 and for the UE2. In this example UE1 (transmitting UE) transmits data to UE2 (receiving UE) over the direct link. The downlink timing—i.e. the point of time where the eNB signaling including the TA command for uplink timing adjustment— received at UE1 is indicated with $Rx_{eNB}@UE1$.

The UE1 downsamples the $N_{TA}$ value determined in the UE based on the TA commands received from the eNb and the autonomous timing adjustment function as described before and transmits a direct link Scheduling Assignment (SA) message including the downsampled $N_{TA}$ value for direct link communication over the direct link (PC5 interface), which is monitored/received by UE2. The direct link SA message is received at UE2 at $Rx_{D2D}\_SA@$ UE2.

According to this configuration, the direct link data will be transmitted from UE1 over direct link with a timing advance adjusted based on the 11 bit $N_{TA}$ value, or in other words with the uplink timing ($Tx_{LTE}\_UE1=Tx_{D2D}\_UE1$). The D2D data or the direct link data transmitted by UE1 is received by the UE2, at the time $Rx_{D2D}\_data@UE2$. On the other hand UE2 calculated the time at which the data from the UE1 have to be expected based on the downsampled 6 bit $N_{TA}$ value received within the SA message. The timing advance value transmitted to the UE2 in the SA message is thus not the same as the timing advance value used by UE1 but only an approximation thereof.

This solution may be problematic at the present time since, based on current technologies, UE2 cannot position its reception window in time correctly, thereby degrading the decoding performance and decreasing the SNR. Nonetheless, it is anticipated that future advances may allow to obtain a good performance also is the timing advance used by UE2 is only an approximation of that used by the UE1, thereby mitigating the aforementioned problems.

In conclusion, the solution described above allows to reduce inter carrier interference because the D2D data are transmitted using the same timing advance for direct link communication and for the legacy LTE uplink communications. However, at present the receiving UE (UE2) can not adjust its reception FFT window efficiently because the 6 bits $N_{TA}$ value sent by the UE1 within the SA message is only an approximation of the 11 bit $N_{TA}$ value used by UE1 for transmitting D2D data.

The problems related to the solution described with reference to FIG. 14 are solved by providing a transmitting UE, which uses, for direct link data transmissions, the same timing advance value used by the receiving UE for setting the reception FFT window for D2D data.

Figure 15:
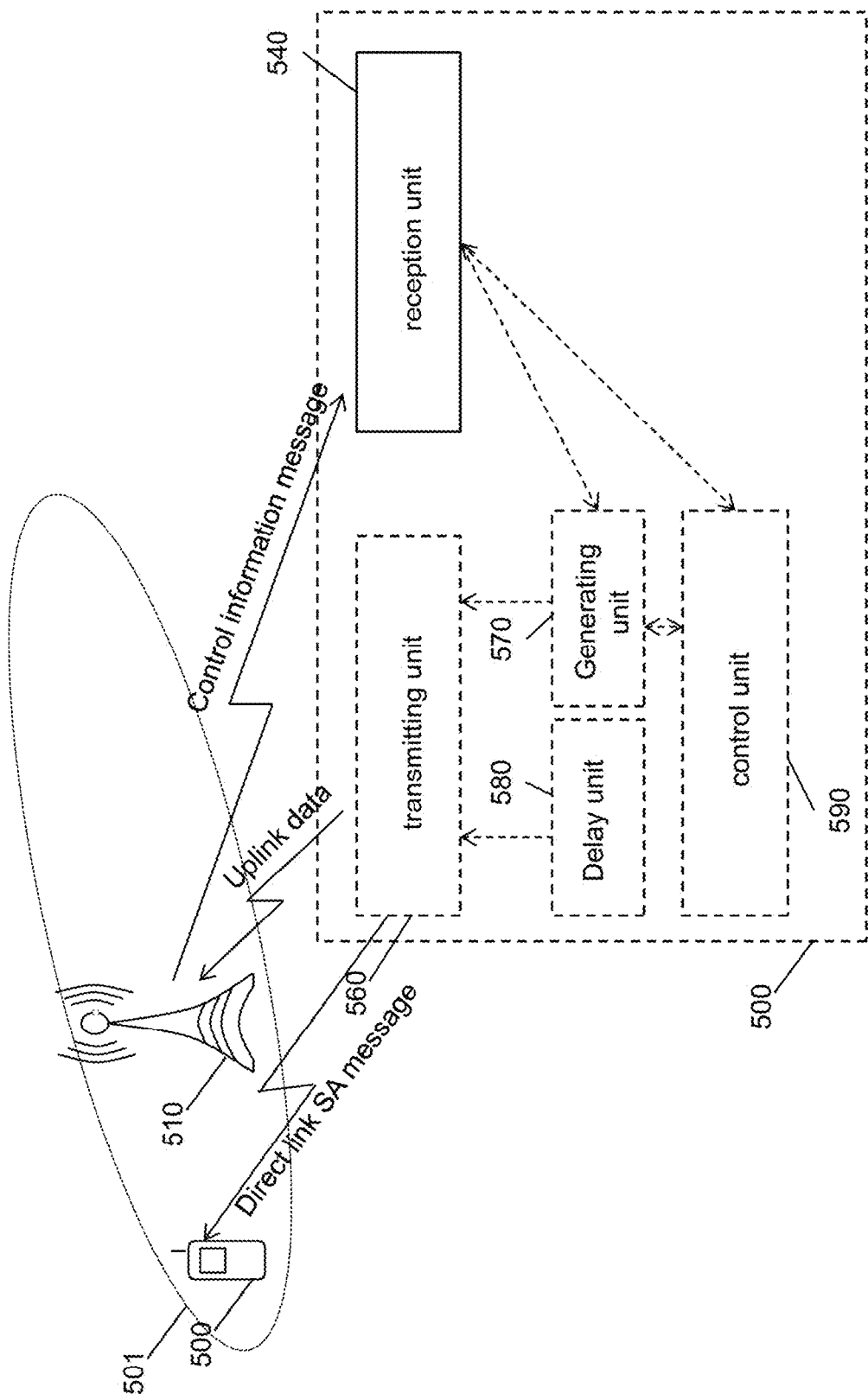
FIG. 15 shows a transmitting/receiving user equipment according to an exemplary development.

A transmitting/receiving user equipment 500 according to this further development is shown in FIG. 15. The user equipment or a terminal 500 is capable of transmitting data to a receiving terminal over a direct link connection in a D2D communication system. The transmitting terminal 500 is configured to determine the transmission timing of the direct link data transmission in the communication system. To this end the transmitting UE 500 comprises a reception or receiving unit (540) that can receive from a base station an uplink message including a timing advance command. The timing advanced command may be a MAC control element and can be used by the UE 500 for adjusting an uplink transmission timing value for data transmissions to the base station. The received TA command is input in to a generating unit 570 either directly or through a control unit and the generating unit 570 generates, based on the input TA command an uplink transmission timing value for controlling transmission timing in uplink to the base station 510.

At the same time, the generating unit 570 generates, based on the uplink transmission timing value, direct link timing information. The direct link timing information is used by the transmitting terminal 500 in order to determine the timing of the data transmission to the receiving terminal over the direct link.

The transmitting terminal 500 transmits by means of a transmitting unit 560, the generated direct link timing information to the receiving terminal 500. The transmitted direct link timing information can be used at the receiving terminal for generating a direct link reception timing value. Advantageously, the timing for direct link data transmission determined at the transmitting terminal is the same as the direct link reception timing value calculated at the receiving terminal.

Figure 16:
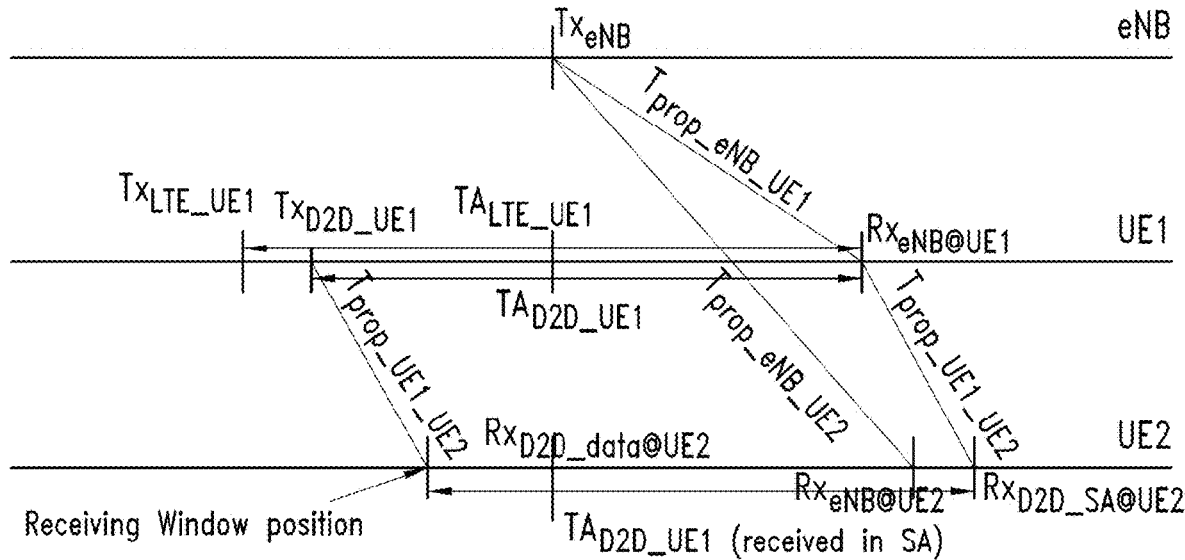
FIG. 16 illustrates a scheme for controlling transmission timing for transmitting data from a transmitting UE to a receiving UE over a direct link connection according to the configuration shown in FIG. 15.

FIG. 16 illustrates scheme for controlling transmission timing for transmitting data from a transmitting UE (UE1) to a receiving UE (UE2) over a direct link connection according to the configuration shown in FIG. 15. The UE1 uses a TA value for direct link transmission which is the same TA value transmitted in the direct link SA to UE2. Therefore, the reception window determined by UE2 using the direct link TA value ($TA_{D2D}\_UE1$) can be adjusted to match the transmission timing $Rx_{D2D}\_data@UE2$ of D2D data.

In an exemplary implementation of the solution described above the UE1 generates and maintains, based on e.g. the received uplink TA commands from eNB, an 11 bits $N_{TA}$ value for adjusting the transmission timing for the legacy LTE uplink transmissions to the base station. At the same time, the UE1 downsamples the 11 bits $N_{TA}$ value in order to create a 6 bits direct link timing information. The direct link timing information may be for instance created by taking the 6 most significant bits of the uplink $N_{TA}$ value maintained for LTE uplink operation. The direct link timing information will then be transmitted, for example incorporated in the direct link SA message, to UE2 on one hand. On the other hand, UE1 generates based on the direct link timing information an 11 bits direct link $N_{TA}$ value. The 11 bits direct link $N_{TA}$ value may be for instance created by prepending a series of zeros to the direct link timing information. Similarly, UE2 will extract from the received direct link SA message the 6 bits direct link timing information and recover, based thereon, the 11 bits direct link $N_{TA}$ value by prepending a series of zeros to the signaled direct link timing information. Accordingly, the direct link $N_{TA}$ value used by UE2 for adjusting the reception FFT window will be the same as that timing advance value used by the UE1 for data transmission over the direct link. As further shown in FIG. 16 the UE2 applies the generated $N_{TA}$ value to the reception timing of the SA message.

The idea above can be explained by means of the following example. If the 11 bits $N_{TA}$ value for LTE uplink data transmissions to the base station is $N_{TA\_UPLINK}$=11011011001, the downsampled direct link timing information calculated by considering the 6 MSB will be 110110. In downsampling the information carried out by UE1 the first bits will be lost and the direct link transmission timing value will be given by $N_{TA\_D2D}$=11011000000. Similarly, the receiving UE (UE2) will receive with the SA message the direct link timing information conveying the value to 110110. Based thereon, UE2 can generate a direct link reception timing value by prepending to the received value a series of zero. The direct link reception timing value will be $N_{TA\_D2D}$=11011000000.

The above is only an example to explain how the general concepts of the invention can be applied in a specific implementation. It has however to be clear that this example is not limiting. For instance, the uplink transmission timing value may be shorter or longer than 11 bits. Similarly the direct link timing information may be generated by means of a procedure different than the downsampling. Although reference is made to a direct link timing information having 6 bits, the direct link timing information may also be longer. Same also applies to the direct link transmission timing value.

The timing advance values generated at the UE1 and at the UE2 for determining the transmission and reception timing for D2D data respectively are thus the same and this allows the receiving terminal to set a reception FFT window that matches the transmission timing of D2D data. Clearly the direct link timing value calculated at the UE1 and UE2 will not be the same as the uplink transmission timing value for legacy LTE uplink transmission but only an approximation thereof. This discrepancy may at the present time in light of the present technologies generate, under certain conditions, inter-carrier interference for LTE uplink transmission at the eNB reception site because the uplink timing for transmitting data to the eNb is different from the transmission timing for D2D data transmission.

A further development that allows reducing inter-carrier interference consists in a configuration implementing both the solution described with reference to FIG. 14 and the solution described with respect to FIGS. 15 and 16.

According to this further development the base station determines which scheme will be used. Specifically, the base station 510 of the direct link communication system, which is adapted to control the time for direct link data transmission in the communication system, comprises a receiving unit adapted to receive from the transmitting terminal 500 a resource request message for allocation of resources for uplink data transmission. The base station generates, at a generating unit configuration information which is transmitted by means of a transmitting unit in the base station to the transmitting UE 500 or UE1. The UE1 uses the received configuration information for performing control of the transmission timing over the direct link.

In particular, at the transmitting unit 500, the receiving unit 540 receives the configuration information from the base station. Subsequently, in accordance with the received configuration information, the transmitting UE 500, for example at the transmitting unit 560, selects (1) the generated direct link timing information or (2) the uplink transmission timing value used for uplink transmission to the base station. Based on the selection, the transmitting UE controls transmission timing over the direct link.

In case (1), the transmitting UE will generate a direct link transmission timing value as described with reference to the FIGS. 15 and 16, thereby preferring a scheme that assures a good decoding performance but increases inter-frame interference. This solution could be used if the base station implements ICI mitigation techniques, such as guard bands or the like, in order to mitigate ICI. This solution could also be used if the base station does not consider necessary to reduce interference.

In case (2), the transmitting UE will use the legacy LTE uplink transmission timing for uplink transmission to the base station also for transmitting data to the receiving UE over the direct link. The D2D transmission timing will, in this case, be aligned with the LTE uplink transmission timing, thereby keeping the ICI for uplink transmission of data to the base station low. The trade-off of this transmission scheme is that the reception FFT window for the D2D data transmitted by the transmitting UE will not be efficiently adjusted. Such solution can be used in cases where the protection of LTE uplink transmission due to the avoidance of additional inter-carrier interference caused by direct link data transmission is of more importance than the D2D performance. For example in cases where eNB has no means to deploy ICI mitigation techniques like power control or guard bands such solution might be advantageous from network point of view.

According to a further development, which would solve the problem of reducing interference and obtain a good decoding performance, the transmitting UE may include in direct link SA message the uplink timing advance value $N_{TA}$ generated e.g. based on the TA commands received from the base station for adjusting the transmission timing of LTE uplink transmissions. In other words, according to this development the direct link SA message includes the 11 bit $N_{TA}$ value, which will be signalled to the receiving UE instead of a downsampled 6 bits uplink transmission timing. Accordingly, the same timing advance value will be used for D2D data transmission and reception, thereby allowing the receiving UE to exactly adjust the FFT transmission window. Furthermore, since the D2D data transmission timing is the same as the uplink data transmission timing to the base station, ICI to LTE uplink transmission can be minimized. This solution requires, however to transmit to the receiving UE an SA message including a TA field of 11 bits, thereby increasing signalling.

According to a further development, the transmitting UE may select at a control unit 590, independently from the base station, which transmission scheme is to be used for the D2D transmission timing.

The transmitting terminal includes a control unit 590 which is, among others, adapted to select based on a predefined selection criterion, whether the timing for the transmission of data over the direct link should be adjusted (1) based on the generated direct link timing information or (2) based on the uplink transmission timing information value used for uplink transmission to the base station. The two options are the same, which have been described previously in text and will not be described again.

The selection criterion may comprise comparing a cyclic prefix length for uplink transmissions to the base station and a cyclic prefix length for transmissions on the direct link or determining whether the transmitting terminal is in a connected or idle state.

Specifically, in case that cyclic prefix length for uplink transmission to the base station (LTE WAN) is different than the cyclic prefix length for direct link transmission (D2D transmission), the ICI in the cell will be high and the base station will need to implement measures to mitigate interference, such as band guards and the like. In this case, since guard bands for reducing ICI are already configured, the transmitting UE may decide to choose scheme (1) and use the direct link timing information signalled to the receiving UE for adjusting the transmission timing of D2D data transmission. This solution allows the receiving UE to exactly adjust the FFT reception window, thereby obtaining good decoding performance at the expense of higher interference. The higher interference on the uplink transmission will then be mitigated through the guard bands for example.

On the contrary, the transmitting UE may determine the direct link transmission timing according to scheme (2), in the case that the cyclic prefix length for uplink transmission to the base station (LTE WAN) and for direct link transmission (D2D transmission) are the same. In this case the base station may not implement or use any measure for mitigating ICI and therefore it may be preferred the transmission timing control scheme for D2D transmission that allows reducing the inter-frame interference. To this end, the transmitting UE may use the LTE uplink transmission timing value for determining the timing of the data transmission over the direct link.

Finally, as an further exemplary embodiment if the transmitting UE is not able to determine the cyclic prefix length for LTE WAN, same can control transmission timing over the direct link according to scheme (1).

Alternatively or in addition, the transmitting UE may decide which scheme is to be used for controlling direct link transmission timing based on the RRC state. If the transmitting UE is in a RCC_CONNECTED state, the transmitting UE may use the direct link timing information for generating a direct link transmission timing value, which will then be used for determining the timing of the data transmission over the direct link (scheme 2). Otherwise, if the transmitting UE is in an RCC_IDLE state, it may use a direct link transmission timing advance value which is equal to 0. Specifically, if the transmitting UE is in idle mode, it will not receive from the base station any TA commands as it has no RRC connection to the base station and therefore it will not have any uplink transmission timing advance value. Therefore the transmitting UE in RRC IDLE mode cannot align the direct link transmission timing to the LTE uplink transmission timing. As a consequence according to an exemplary embodiment the transmitting UE in RRC_IDLE uses the downlink timing, i.e. the timing when SA message is received, for transmission of data over the direct link.

Figure 17:
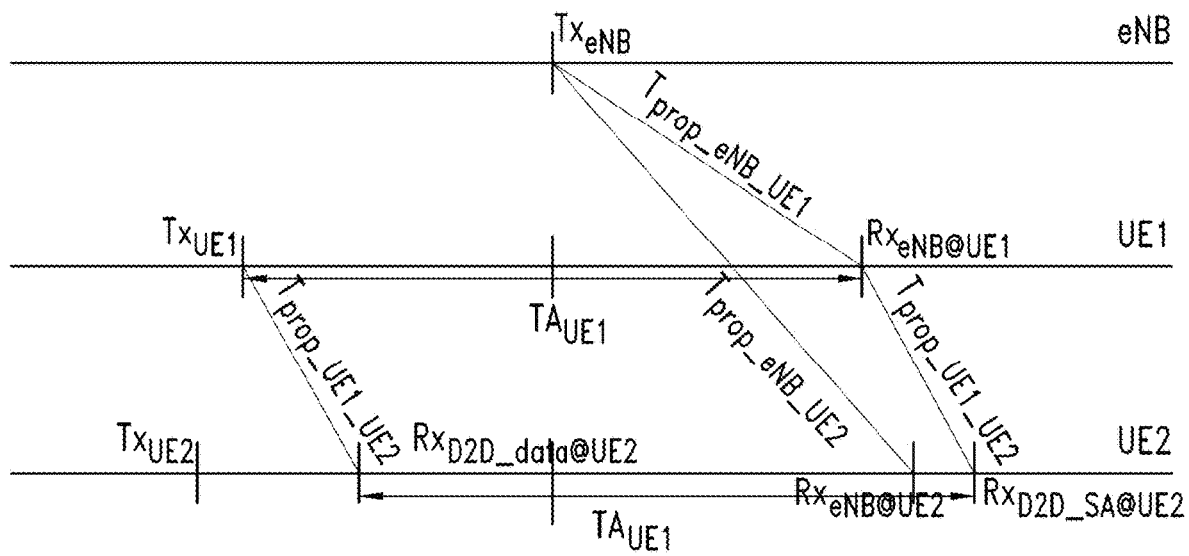
FIG. 17 shows a scheme for controlling transmission timing for transmitting data from a transmitting UE to a receiving UE over a direct link connection according to a further development.

According to a further embodiment the data reception FFT window position is determined based on the reception timing of the SA message. Specifically, the direct link timing information included in the SA message received at the receiving UE from the transmitting UE is used as the reference timing for the positioning of the reception FFT window. More in particular the receiving UE applies the timing advance value generated based on the received direct link timing information within the SA message to the SA reception timing. Accordingly, the receiving UE may include a storing unit adapted to store, for instance in a variable, the reception timing of the SA message from the transmitting UE. The stored reception timing will be then used to compute the position of the receiving FFT window for the D2D data reception. Alternatively D2DSS/PD2DSCH can be used as timing reference. FIG. 17 shows how the position of the receiving window for D2D data can be set according the method above.

According to another embodiment the transmitting terminal, which is capable of data transmissions over the direct link may be configured with a separate Timing Advance Timer and/or respectively TAT value for D2D. This Timing Advance Timer (TAT) value maybe for example configured to infinity. Such a choice would imply as a consequence that a transmitting UE can always transmit data over the direct link, even for cases where no LTE uplink transmission to the base station is allowed since the TAT is expired for LTE uplink transmissions. In such a case the transmitting UE may determine the transmission timing for the direct link data transmission according to the last available $N_{TA}$ value stored in the storing unit of the transmitting terminal.

Alternatively the transmitting UE may use a timing advance equal to zero for transmission timing of direct link data. In other words, the transmitting UE may use the same transmission timing used for transmission of the SA message or control information message over the direct link.

According to another embodiment the transmitting terminal, which is capable of data transmissions over the direct link may also follow the Timing Alignment Timer used for LTE uplink transmission timing control. More in particular when TAT timer has expired and UE is not allowed to make any LTE uplink transmissions to the base station, the transmitting UE is also not allowed to make direct link data transmissions and/or discovery announcements over the direct link. The TAT timer needs to be restarted first by reception of a TA command. For resource allocation mode 1 the transmitting UE should trigger and perform the random access procedure before sending any uplink transmissions to the base station, e.g. dedicated scheduling request on PUCCH, or any data transmission over the direct link. Similarly according to another embodiment the transmitting UE, when being configured to use resource allocation mode 2 for D2D data communication may trigger or perform the random access procedure before sending scheduling assignment message or data over the direct link in case the Timing Alignment Timer has been expired.

In summary and according to an embodiment, a transmitting terminal for transmitting data to a receiving terminal over a direct link connection in a communication system is given. The transmitting terminal is adapted to determine the transmission timing of the direct link data transmission in the communication system and comprises a receiving unit adapted to receive from the base station an uplink control information message including a timing command for adjusting an uplink transmission timing value for data transmissions to the base station. A generating unit is configured to generate direct link timing information, based on the uplink transmission timing value used for uplink transmissions to the base station, the direct link timing information being usable for generating a direct link transmission timing value for determining the timing of the data transmission over the direct link. A transmitting unit transmits to the receiving terminal the generated direct link timing information, the direct link timing information being usable at the receiving terminal for generating a direct link reception timing value for determining the reception timing of data to be received on the direct link from the transmitting terminal.

In the transmitting terminal the generating unit may be adapted to downsample the uplink transmission timing information value used for uplink transmissions to the base station, the direct link timing information being the downsampled uplink transmission timing value. The downsampled uplink transmission timing value may comprise the n most significant bits of the uplink transmission timing information value used for uplink transmission to the base station, n being a predefined value.

Further, the timing of the data transmission over the direct link may be given by the a direct link transmission timing value, and the direct link transmission timing value may be equal to the direct link reception timing value generated at a receiving terminal for determining the reception timing of data to be received on the direct link.

In the transmitting terminal the timing of the data transmission over the direct link may be given by the uplink transmission timing information value used for uplink transmissions to the base station.

According to a further advantageous development, the receiving unit in the transmitting terminal is further adapted to receive configuration information from the base station, and the transmitting unit is configured to use the generated direct link transmission timing value timing information or the received downlink uplink timing information value for scheduling controlling transmission timing over the direct link in accordance with the received configuration information.

The transmitting terminal may further include a control unit adapted to select, based on a predefined selection criterion whether the uplink transmission timing information value used for uplink transmission to the base station or the generated direct link transmission timing value timing information is to be used as the transmission timing over the direct link for transmitting data over the direct link.

Advantageously, the selection criterion may comprise (1) comparing the a cyclic prefix length for uplink transmissions to the base station and the a cyclic prefix length for transmissions on the direct link; or (2) determining whether the transmitting terminal is in a connected or idle state.

In the transmitting terminal the direct link timing information is generated based on the reception timing of the control information message and on the uplink transmission timing value for data transmissions to the base station.

An advantageous embodiment refers to a base station for use in a direct link communication system, the base station being adapted to control the time scheduling for direct link data transmission in the communication system. The base station comprises a receiving unit adapted to receive from a transmitting terminal a resource request message for allocation of resources for uplink data transmission. A generating unit is adapted to generate configuration information for configuring, by the transmitting terminal, timing information for scheduling controlling transmission timing over the direct link. A transmitting unit transmits the configuration information to the transmitting terminal.

A further advantageous embodiment refers to a receiving terminal for receiving data from a transmitting terminal over a direct link connection in a communication system. The receiving terminal comprises a receiving unit adapted to receive from the transmitting terminal direct link timing information generated at the transmitting terminal based on uplink transmission timing value used for uplink transmissions to the base station. A generating unit generates a direct link reception timing value based on the received direct link timing information. The receiving unit controls the reception timing of data to be received on the direct link from the transmitting terminal on the generated direct link reception timing value.

In the receiving terminal the direct link timing information is a downsampled uplink transmission timing value, and the generating unit is configured to prepend to the downsampled timing information a predefined number of zero bits.

According to an advantageous embodiment, the direct link reception timing value is equal to a direct link transmission timing value generated at a transmitting terminal for determining timing of the data transmission over the direct link.

A further advantageous embodiment refers to a communication method for controlling transmission timing of direct link data transmission by a transmitting terminal in a communication system. The method comprises the steps of:

at a receiving unit receiving from the base station an uplink control information message including a timing command for adjusting an uplink transmission timing value for data transmissions to the base station;

at a generating unit generating direct link timing information, based on the uplink transmission timing value used for uplink transmissions to the base station, the direct link timing information being usable for generating a direct link transmission timing value for determining the timing of the data transmission over the direct link; and at a transmitting unit transmitting to the receiving terminal the generated direct link timing information, the direct link timing information being usable at the receiving terminal for generating a direct link reception timing value for controlling the reception timing of data to be received on the direct link from the transmitting terminal; and at a transmitting unit transmitting to the receiving terminal the data over the direct link with the generated direct link transmission timing value transmission timing determined by the generated direct link timing information.

The communication method may further comprise the step of downsampling the received uplink transmission timing value used for uplink transmissions to the base station, the direct link timing information being generated based on the downsampled uplink transmission timing value. The downsampled timing information may comprise, as an example, the n most significant bits of the uplink transmission timing value, n being a predefined value.

In the communication method described above, the timing of the data transmission over the direct link is given by the direct link transmission timing value, and wherein the direct link transmission timing value is equal to the direct link reception timing value generated at a receiving terminal for determining the reception timing of data to be received on the direct link.

The timing of the data transmission over the direct link may be given by the uplink transmission timing information value used for uplink transmissions to the base station.

Advantageously, the communication method as described above further comprises:

receiving from a base station configuration information, the configuration information being preferably included in the control information, and controlling transmission timing over the direct link based on the generated direct link transmission timing value or on the uplink transmission timing value in accordance with the received configuration information.

This method may for example select, at a selecting unit, based on a predefined selection criterion whether the uplink transmission timing value or the direct link transmission timing value is to be used for controlling transmission timing of direct link data transmission.

The selection criterion may advantageously comprise (1) comparing a downlink cyclic prefix length for uplink transmissions to the base station and a cyclic prefix length for transmissions on the direct link; or (2) determining whether the transmitting terminal is in a connected or idle state.

A further advantageous embodiment refers to a communication method for controlling transmission timing of direct link data transmission by a receiving terminal in a communication system. The method comprises the steps of at a receiving unit receiving, from a transmitting terminal, direct link timing information generated at the transmitting terminal based on uplink transmission timing value used for uplink transmissions to the base.

at a generating unit generating a direct link reception timing value based on the received direct link timing, and controlling, at the receiving unit, the reception timing of data to be received on the direct link from the transmitting terminal based on the generated direct link reception timing.

This communication method may further comprise the step of prepending, at the generating unit, a predefined number of zero bits to the direct link timing information if the direct link timing information is generated based on a downsampled uplink transmission timing value.

A further advantageous embodiment refers to a communication method for controlling, by a base station, transmission timing of direct link data transmission in a communication system and comprising:

at a receiving unit receiving from a transmitting terminal a resource request message for allocation of resources for uplink data transmission to the base station;

generating, at a generating unit, configuration information for configuring, by the transmitting terminal, timing information for controlling transmission timing over the direct link, and at a transmitting unit transmitting the generated the configuration information.

Another aspect of the invention relates to the implementation of the above described various embodiments and aspects using hardware and software. In this connection the invention provides a user equipment (mobile terminal) and a eNodeB (base station). The user equipment is adapted to perform the methods described herein. Furthermore, the eNodeB comprises means that enable the eNodeB to evaluate the Intelligent Platform Management Interface (IPMI) set quality of respective user equipments from the IPMI set quality information received from the user equipments and to consider the IPMI set quality of the different user equipments in the scheduling of the different user equipments by its scheduler.

It is further recognized that the various embodiments of the invention may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

It should be further noted that the individual features of the different embodiments of the invention may individually or in arbitrary combination be subject matter to another invention.

It would be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

What is claimed is:

1. A communication apparatus configured for device-to-device (D2D) communication, comprising:
a receiver which, in operation, receives control information indicating an uplink Timing Advance value from a base station, the uplink Timing Advance value being used to adjust an uplink transmission timing to the base station, and
a transmitter which, in operation, transmits direct link data and direct link control information including a direct link Timing Advance indication to another communication apparatus,
wherein the direct link data and the direct link control information are not transmitted by the transmitter in a case where a timing alignment timer (TAT) used for an uplink transmission to the base station has expired.

2. The communication apparatus according to claim 1, wherein the direct link Timing Advance indication is generated by the communication apparatus based on the uplink Timing Advance value.

3. The communication apparatus according to claim 1, wherein the direct link Timing Advance indication is generated by the communication apparatus by setting bits of the direct link Timing Advance indication to zeros when the communication apparatus is in a transmission mode which schedules resources autonomously by the communication apparatus.

4. The communication apparatus according to claim 1, wherein the direct link Timing Advance indication is generated by the communication apparatus based on the uplink Timing Advance value when the communication apparatus is in an RRC_CONNECTED state, and the direct link data is generated by the communication apparatus by setting the direct link data to zeros when the communication apparatus is in an RRC_IDLE state.

5. The communication apparatus according to claim 1, wherein the direct link data is transmitted to the other communication apparatus based on a direct link transmission timing according to the direct link Timing Advance indication.

6. A communication method performed by a communication apparatus configured for device-to-device (D2D) communication, the communication method comprising:
receiving control information indicating an uplink Timing Advance value from a base station, the uplink Timing Advance value being used to adjust an uplink transmission timing to the base station, and
transmitting direct link data and direct link control information including the direct link Timing Advance indication to another communication apparatus,
wherein the direct link data and the direct link control information are not transmitted by the communication apparatus in a case where a timing alignment timer (TAT) used for an uplink transmission to the base station has expired.

7. The communication method according to claim 6, wherein the direct link Timing Advance indication is generated by the communication apparatus based on the uplink Timing Advance value.

8. The communication method according to claim 6, wherein the direct link Timing Advance indication is generated by the communication apparatus by setting bits of the direct link Timing Advance indication to zeros when the communication apparatus is in a transmission mode which schedules resources autonomously by the communication apparatus.

9. The communication method according to claim 6, wherein the direct link Timing Advance indication is generated by the communication apparatus based on the uplink Timing Advance value when the communication apparatus is in an RRC_CONNECTED state, and the direct link data is generated by the communication apparatus by setting the direct link data to zeros when the communication apparatus is in an RRC_IDLE state.

10. The communication method according to claim 6, wherein the direct link data is transmitted to the other communication apparatus based on a direct link transmission timing according to the direct link Timing Advance indication.

11. A communication apparatus configured for device-to-device (D2D) communication, comprising:
a receiver which, in operation, receives direct link control information including a direct link Timing Advance indication from another communication apparatus, and
circuitry which, in operation, sets a reception timing according to the direct link Timing Advance indication to receive direct link data,
wherein the direct link data and the direct link control information are not transmitted from the other communication apparatus in a case where a timing alignment timer (TAT) used for an uplink transmission to a base station has expired.

12. The communication apparatus according to claim 11, wherein the direct link Timing Advance indication is generated by the other communication apparatus based on an uplink Timing Advance value, the uplink Timing Advance values being used to adjust an uplink transmission timing to the base station.

13. The communication apparatus according to claim 11, wherein the direct link Timing Advance indication is generated by the other communication apparatus by setting bits of the direct link Timing Advance indication to zeros when the other communication apparatus is in a transmission mode which schedules resources autonomously by the other communication apparatus.

14. The communication apparatus according to claim 11, wherein the direct link Timing Advance indication is generated by the other communication apparatus based on an uplink Timing Advance value when the other communication apparatus is in an RRC_CONNECTED state, and the direct link data is generated by the other communication apparatus by setting the direct link data to zeros when the other communication apparatus is in an RRC_IDLE state.

15. The communication apparatus according to claim 11, wherein the direct link data is transmitted to the other communication apparatus based on a direct link transmission timing according to the direct link Timing Advance indication.

16. A communication method performed by a communication apparatus configured for device-to-device (D2D) communication, the communication method comprising:
receiving direct link control information including a direct link Timing Advance indication from another communication apparatus, and
setting a reception timing according to the direct link Timing Advance indication to receive direct link data,
wherein the direct link data and the direct link control information are not transmitted from the other communication apparatus in a case where a timing alignment timer (TAT) used for an uplink transmission to a base station has expired.

17. The communication method according to claim 16, wherein the direct link Timing Advance indication is generated by the other communication apparatus based on an uplink Timing Advance value, the uplink Timing Advance values being used to adjust an uplink transmission timing to the base station.

18. The communication method according to claim 16, wherein the direct link Timing Advance indication is generated by the other communication apparatus by setting bits of the direct link Timing Advance indication to zeros when the other communication apparatus is in a transmission mode which schedules resources autonomously by the other communication apparatus.

19. The communication method according to claim 16, wherein the direct link Timing Advance indication is generated by the other communication apparatus based on an uplink Timing Advance value when the other communication apparatus is in an RRC_CONNECTED state, and the direct link data is generated by the other communication apparatus by setting the direct link data to zeros when the other communication apparatus is in an RRC_IDLE state.

20. The communication method according to claim 16, wherein the direct link data is transmitted to the other communication apparatus based on a direct link transmission timing according to the direct link Timing Advance indication.

* * * * *